United States Patent
Weinstein et al.

(10) Patent No.: US 7,116,437 B2
(45) Date of Patent: Oct. 3, 2006

(54) INTER-OBJECTIVE BAFFLE SYSTEM

(75) Inventors: Ronald S. Weinstein, Tucson, AZ (US); Michael R. Descour, Tucson, AZ (US); Chen Liang, Tucson, AZ (US); Peter H. Bartels, Tucson, AZ (US); Roland V. Shack, Tucson, AZ (US)

(73) Assignee: DMetrix Inc., Tucson, AZ (US)

( * ) Notice: Subject to any disclaimer, the term of this patent is extended or adjusted under 35 U.S.C. 154(b) by 657 days.

(21) Appl. No.: 10/243,648

(22) Filed: Sep. 16, 2002

(65) Prior Publication Data

US 2003/0067680 A1 Apr. 10, 2003

Related U.S. Application Data

(60) Provisional application No. 60/318,876, filed on Sep. 14, 2001.

(51) Int. Cl.
*H04N 1/40* (2006.01)

(52) U.S. Cl. ................................. 358/1.15; 358/1.18

(58) Field of Classification Search ............... 358/1.9, 358/2.1, 1.15–1.18, 484; 382/141, 144, 212
See application file for complete search history.

(56) References Cited

U.S. PATENT DOCUMENTS

| | | | |
|---|---|---|---|
| 4,149,090 A | 4/1979 | Agulnek | |
| 4,168,900 A | 9/1979 | Adachi | |
| 4,448,499 A | 5/1984 | Tokumaru | |
| 4,692,812 A | 9/1987 | Hirahara et al. | |
| 4,725,890 A | 2/1988 | Yaniv et al. | |
| 4,728,803 A | 3/1988 | Catchpole et al. | |
| 4,734,787 A | 3/1988 | Hayashi | |
| 4,879,250 A | 11/1989 | Chan | |
| 4,899,226 A | 2/1990 | Tanimoto et al. | |
| 5,055,894 A | 10/1991 | Chan | |
| 5,144,448 A | 9/1992 | Hornbaker, III et al. | |
| 5,163,117 A | 11/1992 | Imanishi et al. | |
| 5,270,859 A | 12/1993 | Wirth et al. | |
| 5,517,279 A | 5/1996 | Hugle et al. | |
| 5,532,845 A | 7/1996 | Gusmano | |
| 5,648,874 A | 7/1997 | Sawaki et al. | |
| 5,768,023 A | 6/1998 | Sawaki et al. | |
| 5,787,107 A | 7/1998 | Leger et al. | |
| 5,877,492 A | 3/1999 | Fujieda et al. | |
| 5,973,844 A | 10/1999 | Burger | |
| 6,016,185 A | 1/2000 | Cullman et al. | |
| 6,057,586 A | 5/2000 | Bawolek et al. | |
| 6,088,164 A | 7/2000 | Fukasawa | |
| 6,124,974 A | 9/2000 | Burger | |
| 6,133,986 A | 10/2000 | Johnson | |

(Continued)

FOREIGN PATENT DOCUMENTS

WO WO 02/056084 7/2002

(Continued)

*Primary Examiner*—Thomas D. Lee
*Assistant Examiner*—Stephen Brinich
(74) *Attorney, Agent, or Firm*—Antonio R. Durando

(57) ABSTRACT

A multi-axis imaging system and method wherein a plurality of optical elements are arranged to produce in image space thereof respective images of respective regions in object space thereof, and a plurality of image sensing elements corresponding to respective optical elements are disposed in image space of the image sensing elements to capture images of the respective regions. At least one baffle is positioned along an optical pathway of at least one of the optical elements to block light from outside the field of view of the one of the optical elements from reaching a corresponding image sensing element.

85 Claims, 24 Drawing Sheets

U.S. PATENT DOCUMENTS 6,181,441 B1 1/2001 Walsh
6,281,034 B1 8/2001 Sugimoto et al.
6,343,162 B1 1/2002 Saito et al.
6,348,981 B1 2/2002 Walsh 2002/0090127 A1 7/2002 Wetzel et al.

FOREIGN PATENT DOCUMENTS

WO  WO 02/056256  7/2002

INTER-OBJECTIVE BAFFLE SYSTEM

CROSS-REFERENCE TO RELATED APPLICATIONS

The present document contains subject matter related to that disclosed in the U.S. Patent Application Ser. No. 60/276, 498 filed Mar. 19, 2001, entitled MINIATURIZED MICROSCOPE ARRAY DIGITAL SLIDE SCANNER, the entire contents of which are incorporated herein by reference. The present document claims priority to U.S. Patent Application Ser. No. 60/318,876 filed Sep. 14, 2001, entitled INTER-OBJECTIVE BAFFLE SYSTEM, the entire contents of which are incorporated herein by reference.

BACKGROUND OF THE INVENTION

1. Field of the Invention

The present invention relates to the field of light microscopy. More specifically, this invention relates to multi-axis imaging systems, particularly an array of miniature imaging systems which can scan an entire specimen on a microscope slide in a single pass.

2. Discussion of the Background

Pathologists are physicians responsible for analyzing tissue specimens, fine-needle aspirates of tissues, cytology specimens, and liquid specimens such as urine or blood by light microscopy. Analysis of specimens frequently is accomplished by viewing specimens on slides through a light microscope or by viewing electronic images of the specimens on a video monitor. Video images can be obtained by mounting a video camera on a conventional light microscope and capturing images in either an analog or digital imaging mode. Microscopes with motorized stages translate slides to move one portion of the specimen on the slide into a field of view of the microscope and then translate to move another portion of the specimen into the field of view. Microscopic digital images of entire specimens can be assembled from the individual digital images.

Light microscopes have a field of view (FOV) measuring from tens of microns to millimeters in diameter, depending on the transverse magnification of the microscope objective. To image an entire standard microscope slide (i.e., a 25 mm by 75 mm microscope-slide) requires a conventional light microscope to scan back and forth multiple times. The scanning process is time intensive. As a result, ordinarily not all portions of the pathological specimen are imaged. Rather, the pathologist depends on statistics to determine a normal or an abnormal culture. Digital images of a percentage of the pathological specimen are scanned and captured in a matter of minutes using the conventional motorized light microscope.

While it is possible to design an optical system with a single optical pathway which has a FOV comparable to the microscope slide width, this design requires a very large objective lens which in turn produces a large imaging system requiring substantial stabilization of the microscope during scanning and imaging. As a result, microscopes with smaller objectives and smaller FOVs have been used, and a subsample of a few thousand fields of the pathological sample may be relied upon to represent the histopathology, cytopathology, or histomorphology of the specimen. The complete pathological sample is not necessarily viewed, which can be suboptimal for medical purposes.

Related U.S. Patent Application Ser. No. 60/276,498 entitled MINIATURZED MICROSCOPE ARRAY AND DIGITAL SLIDE SCANNER discloses a novel method and apparatus for rapidly obtaining an image of an entire slide using an array microscope. In general, this is a multiple-optical-axis, or multi-axis, imaging system having a plurality of imaging elements arranged in an array, each imaging element having one or more optical elements disposed along the optical axis thereof. Where the imaging elements are microscopes, the system is a microscope array (MA), or miniature microscope array (MMA) since the imaging elements are preferably very small. Where used to image a single object, the system may be referred to as an "array microscope".

In a multi-axis imaging system such as an MMA, where the imaging elements are closely packed, cross talk between the plurality of imaging elements at the image sensors is a serious problem. Cross talk is caused by unwanted light that originates outside the field of view of an individual imaging element. The field of view is defined herein as the projection of an image-plane sensor or a segment of an image-plane sensor associated with the individual imaging system into an object space, e.g., into an object plane that is conjugate to the image plane. Failure to suppress cross talk in a multi-optical-axis imaging system can lead to a reduction of contrast and/or a reduction in image quality in an image. While the term "cross talk" includes light from neighboring imaging elements, as used herein it is not limited thereto.

As described in the Summary of the Invention and Detailed Description of the Preferred Embodiment hereafter, the present invention is directed to a multi-axis imaging system. In such a system, an individual imaging element can be thought of as being surrounded not by an opaque housing, as is the typical configuration for a single-optical-axis imaging system, but instead by a light-transmitting structure that consists of the neighboring imaging elements and the support structure associated with the multi-axis imaging system. As a result and because of close packing of the imaging elements, light from one imaging element can propagate into another neighboring imaging element; the many surfaces needed to produce multi-axis imaging systems can lead to numerous reflections and scattering of light; and the use of transparent substrates for the arrays of optical elements can allow light to propagate outside an optical element's aperture and yet reach an image sensor.

Accordingly, it can be appreciated that there is a particular need in a multi-axis imaging system to reduce cross talk between imaging elements and other undesirable effects due to unwanted light that reduce image contrast and image quality.

SUMMARY OF THE INVENTION

One object of the present invention is to provide an imaging system which can rapidly scan a microscopy specimen and produce an image of the entire specimen.

Another object of the present invention is to provide a multi-axis imaging system for rapid scanning of an item with improved image quality.

A further object of the present invention is to provide an imaging system with near diffraction-limited optical performance such that the clarity of the images is not degraded by wave-front aberrations, ray aberrations, or chromatic aberrations.

Still another object of the present invention is to provide an imaging system in which specimens with topography variations or thicknesses greater than the depth of field of the optical microscope can be imaged.

Yet another object of the present invention is to provide an imaging system in which color contrasts can be imaged.

Another object of the present invention is to provide an imaging system in which the entire width of a specimen such as, for example, a specimen on a standard 25 mm by 75 mm microscope slide can be imaged in a single scan.

Still another object of the present invention is to image the entire microscopy specimen in which the histopathology, cytopathology, histomorphology, or other related properties of the specimen, can be studied.

Another object of the present invention is to provide a multi-axis imaging system that minimizes the amount of unwanted light that is observed through the system.

Yet another object of the present invention is to image the specimen with a plurality of imaging elements that minimize crosstalk between individual imaging channels.

These and other objects of the present invention are achieved by providing a multi-axis imaging system with a baffle system for minimizing crosstalk between a plurality of individual imaging elements. The baffle system may comprise one or more arrays of baffles disposed along the optical axes of respective imaging elements. One baffle may be located between a final refractive optical element within an imaging element and an image sensor of the imaging element system. The baffle system reduces crosstalk between the plurality of imaging elements as well as other unwanted light at the image sensor. The plurality of imaging elements can include a microscope array that comprises a plurality of microscopes and at least one image sensor located in an image plane of the microscope array. The image sensor is configured to record signals corresponding to images from the microscopes. Each microscope preferably has at least an objective lens configured to collect light from and magnify a section of an object. It may also include a refractive plate configured to focus light from the objective lens and, in tandem with the objective lens, to correct optical aberrations in an image from the object.

The image in each microscope's field of view can be digitally imaged. Using a microscope array (MA) according to the present invention, large areas of a pathological specimen (i.e. the object) can be imaged at high resolution. In the imaging process, the MA moves along a longitudinal direction of a glass slide and stops momentarily and repeatedly to acquire images of adjacent portions of the object. Alternatively, in the imaging process, the MA is stationary and a glass slide moves along a longitudinal direction of the glass slide and stops momentarily and repeatedly while the MA acquires images of adjacent portions of the object. Alternatively, the MA can be translated continuously relative to the glass slide. Alternatively, the glass slide can be translated continuously relative to the MA. Images from each microscope element in the MA are collected and stored in an electronic medium. In one embodiment of the present invention, the images from each microscope element are processed and concatenated into a composite digital file. The composite digital file can be retrieved for example at a workstation, navigated with a browser, and viewed in its entirety.

In an MA according to the present invention, each individual microscope has a small field of view (FOV). When multiple microscopes are packaged in an array then a FOV comparable to the width of a slide containing the pathological specimen can be achieved. In one embodiment of the present invention, the MA system is constructed to have a FOV that covers the entire width of a microscope slide. In this embodiment, only a single scan pass is needed to form a digital image of the entire microscope slide.

Arrays of imaging systems, according to the present invention, in utilizing baffles to minimize crosstalk between different imaging channels, minimize the effects of scattered light and stray light, and of overlapping images formed by neighboring imaging systems.

According to one aspect of the present invention, the baffle system includes interlocking panels. The interlocking panels can be coated with at least one of an absorbing, a non-reflecting, and a non-scattering medium. The baffle system can be an injection molded baffle array.

In another aspect of the present invention, the baffle system includes a baffle array made at least in part by single point diamond turning or the baffle can be made by a lithographic process involving a master.

In another aspect of the present invention, the baffle system includes positioning devices (such as, for example, alignment pins) configured to align the baffle system to the plurality of imaging systems.

In another aspect of the present invention, the baffle system is a stack of aperture arrays, the aperture arrays including an opaque area surrounding at least one aperture on each array. Positioning devices such as, for example, circular apertures are aligned in the stack with alignment pins which are in turn aligned with the plurality of imaging systems.

In another aspect of the present invention, the baffle system is made of a plastic, a hybrid glass, a photosensitive material, an x-ray sensitive material, an electron-sensitive material, a metal, or a metal alloy.

At least one baffle can include rectangular, cylindrical, faceted, or tapered cross sectional walls. The baffle can have constrictions to block cross talk between adjacent microscopes or imaging systems. The imaging systems are arranged in a one-dimensional or a two-dimensional array format.

BRIEF DESCRIPTION OF THE DRAWINGS

A more complete appreciation of the present invention and many attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
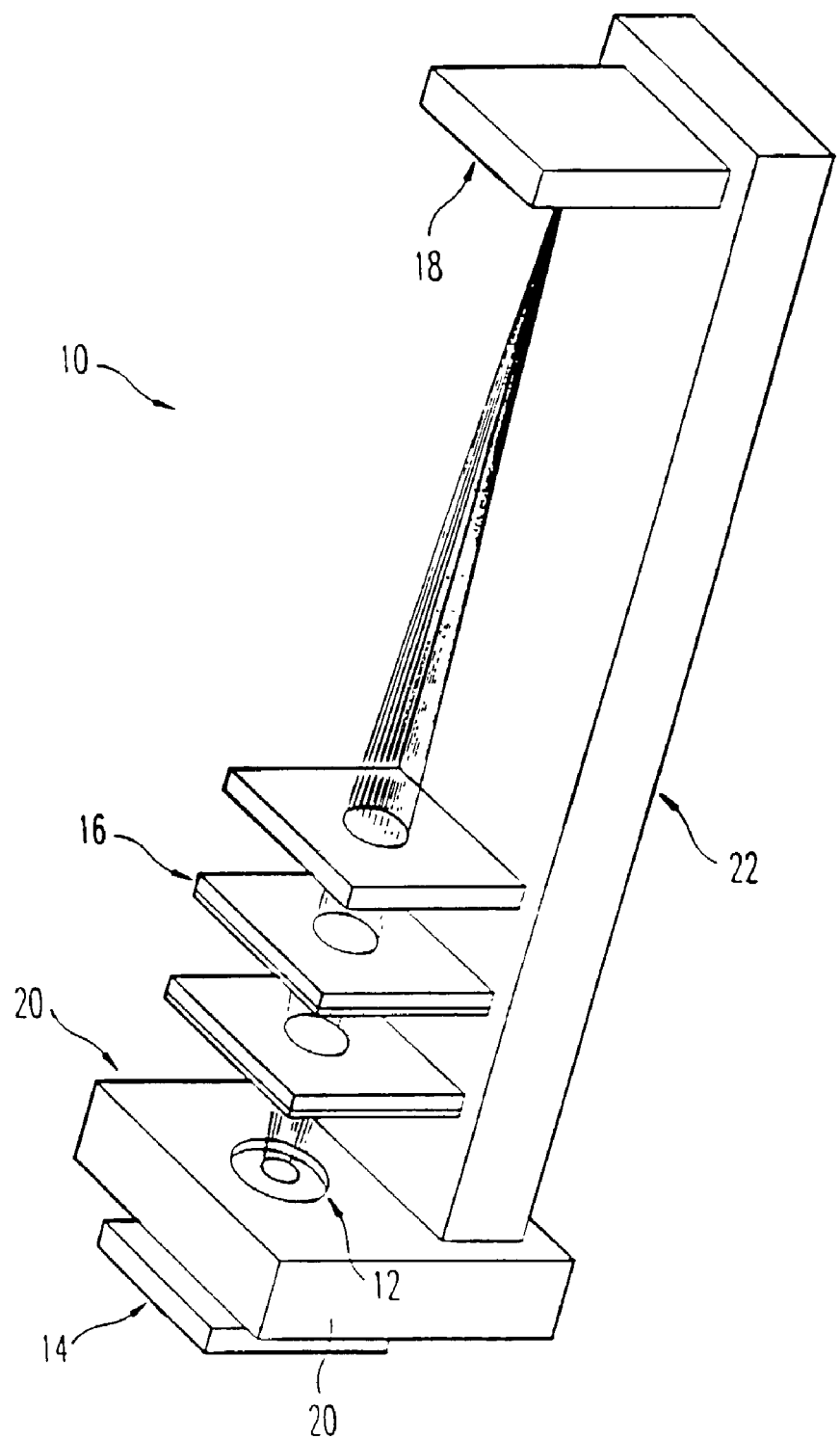
FIG. 1 is a schematic depiction of a single miniaturized microscope in a MA.

As previously noted, the MA according to the present invention includes an array of miniaturized microscopes such that the MA is configured to scan a width of a microscope slide containing an object (i.e., a pathological specimen). Referring now to the drawings, wherein like reference numerals designate identical or corresponding parts throughout the several views, FIG. 1 shows a schematic of an individual miniaturized microscope 10. Each microscope 10 includes an objective lens 12 adjacent to a cover plate 14, at least one refractive plate 16, and an image sensor 18. A specimen (i.e., the object to be imaged) is located beneath the cover plate 14. Qualitatively, the use of multiple refractive plates 16 increases the field of view and improves image quality of each microscope 10. In addition, the objective lens 12 and at least one additional optical element (i.e., a refractive plate 16) function together as one optical system, designed to control aberrations.

This combinational approach differs from an approach in which one individual lens element, such as for example a biaspherical objective lens such as the one disclosed by J. M. Sasian et al., Applied Optics 38, pp. 1163–1168 (1999), is designed to exhibit minimal aberrations. Further, multiple lens elements in a miniature microscope allow correction to various aberrations in the microscope and add flexibility to the manufacturability and cost of the optical system. For example, a relatively low-cost spherical lens (derived from a ball lens) can be combined with an aspheric surface lithographically-patterned corrective optic to achieve the same spherical aberration correction as would be achieved in a more expensive and exacting hyperboloidal lens such as the biaspherical objective lens of Sasian et al.

While an increased number of optical components can increase the field of view, improve image quality and alleviate the cost and exacting precision required for the manufacture of single biaspherical lens, there is an upper limit to the number of optical components to be utilized in each microscope. The upper limit is dictated by the practicality of accurately assembling multiple plates and lenses. The combination of a glass lens (e.g., a planoconvex glass lens as the objective lens) and three refractive lens plates, shown in FIG. 1, represents a suitable combination of manufacturable, relatively low cost components yielding near diffraction-limited performance.

In one embodiment of the present invention, the objective lens 12 is held by a base plate 20 which can be a silicon substrate, a glass substrate, a poly(methylmethacrylate) or a polymer substrate. The objective lens held in the base plate can be made from a Nippon Sheet Glass, gradient index (GRIN) glass, or GRADIUM® glass. The GRIN and GRADIUM® glasses having spatially varying indices of refraction, add more design flexibility to the characteristics of the objective lens 12. Trans-illumination of the object across the field of view or epi-illumination peripheral to the field of view along the base plate 20 illuminates the object for each miniaturized microscope. As shown in FIG. 1, a micro-optical table 22 (MOT) serves as a support for each microscope. The MOT 22 supports the base plate 20, the at least one refractive plates 16, and the image sensor 18. According to the present invention, a silicon substrate can be utilized as the base plate 20. Optical elements such as for example lenses, fiber optics, mirrors, and detectors can be mounted on the base plate 20.

The number of miniaturized microscopes needed to cover an entire width of a microscope slide depends on the ratio of microscope-slide width (e.g., a microscope slide width of 20 mm) to the FOV diameter of each microscope imaging system in the array. A smaller ratio requires fewer microscopes in the array. For the existing NA=0.4 design (as utilized in the single miniaturized element of FIG. 1), the non-overlapping FOV for each microscope is 200 µm in diameter. As a result, in this example, approximately 100 miniature microscopes are needed to image a microscope slide with a width of 20 mm.

Figure 2A:
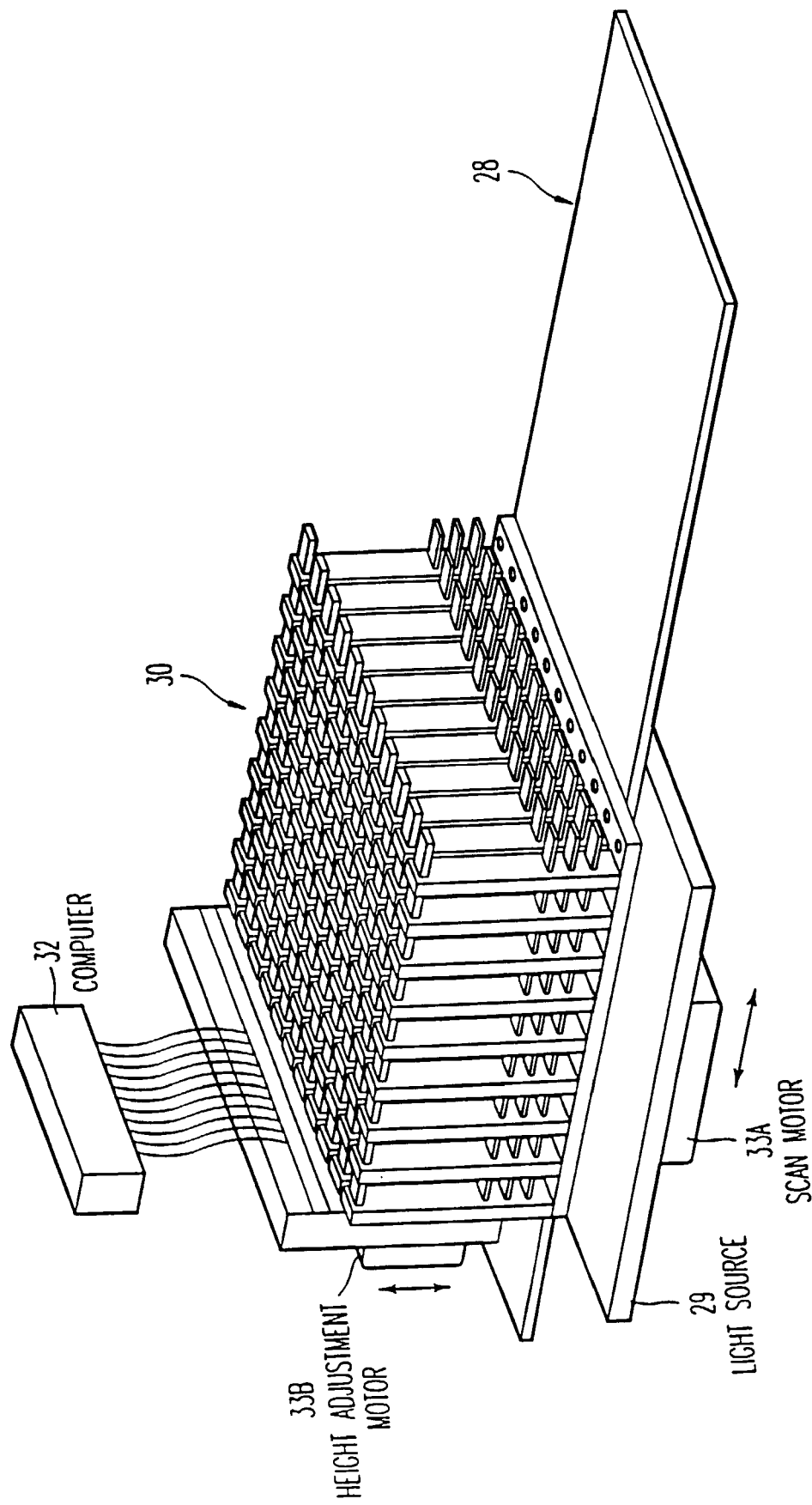
FIG. 2A is an isometric view of a MA with 99 microscopes.
Figure 2B:
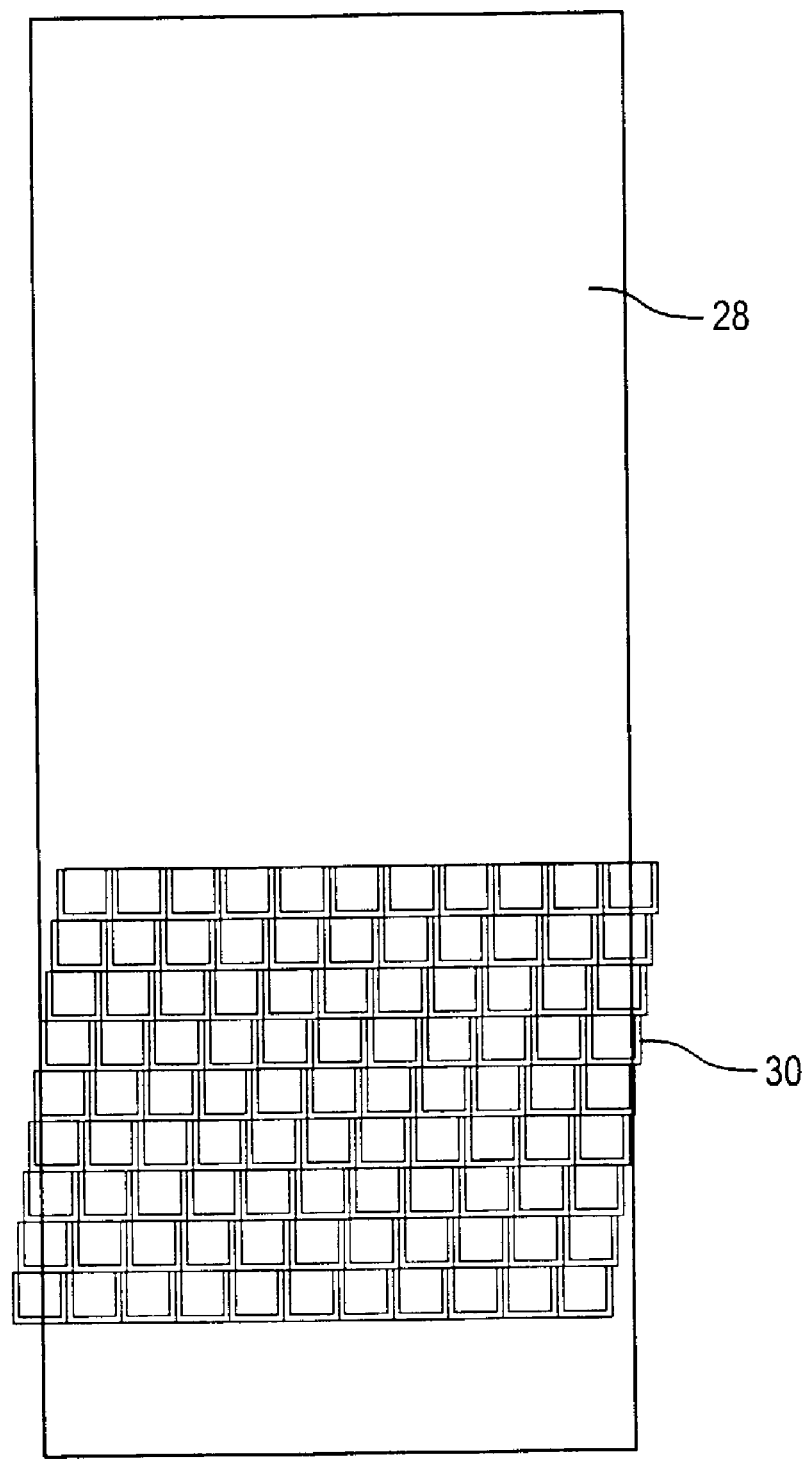
FIG. 2B is a top view of a MA with 99 microscopes.

The design depicted in FIG. 2A shows a completed MA array 30 with a spacing between adjacent microscopes of 1.78 mm. This spacing determines the number of microscopes that can be arranged across the width of the microscope slide. This spacing as compared to the FOV diameter determines the number of microscope rows needed to form a composite field of view which equals the microscope-slide width. Based on these considerations, the MA can be arranged as depicted in FIG. 2B in a rectangular fashion with staggered rows. An object area measuring 20 mm by 50 mm on a standard microscope slide can be imaged, according to the present invention, by an array of 99 microscopes organized in 9 rows of 11 microscope in each row (see FIG. 2B). In such an arrangement, the overall size of the completed MA 30 is 7.25 mm high, 16.9 mm long (i.e., in the direction along the length of the microscope slide 28) and 23.1 wide (i.e., in the direction across the width of the microscope slide 28).

The MA 30, as shown in FIG. 2A, scans via a scan motor 33A longitudinally across the slide 28 imaging the object on the microscope slide 28. Alternatively, the scan motor 33A could move the slide 28 under a stationary MA. The scanning motion may be continuous or the scanning motion may be step-and-image, in which case the microscope slide 28 is advanced in steps less than or equal to the FOV diameter of an individual microscope 10, an image is recorded, and the next step is taken. A light source 29 transilluminates or epi-iluminates the object on the slide. For epi-illumination, light can be transmitted to the object by light guides on the base plate 20 holding the objective lens 12.

Figure 3:
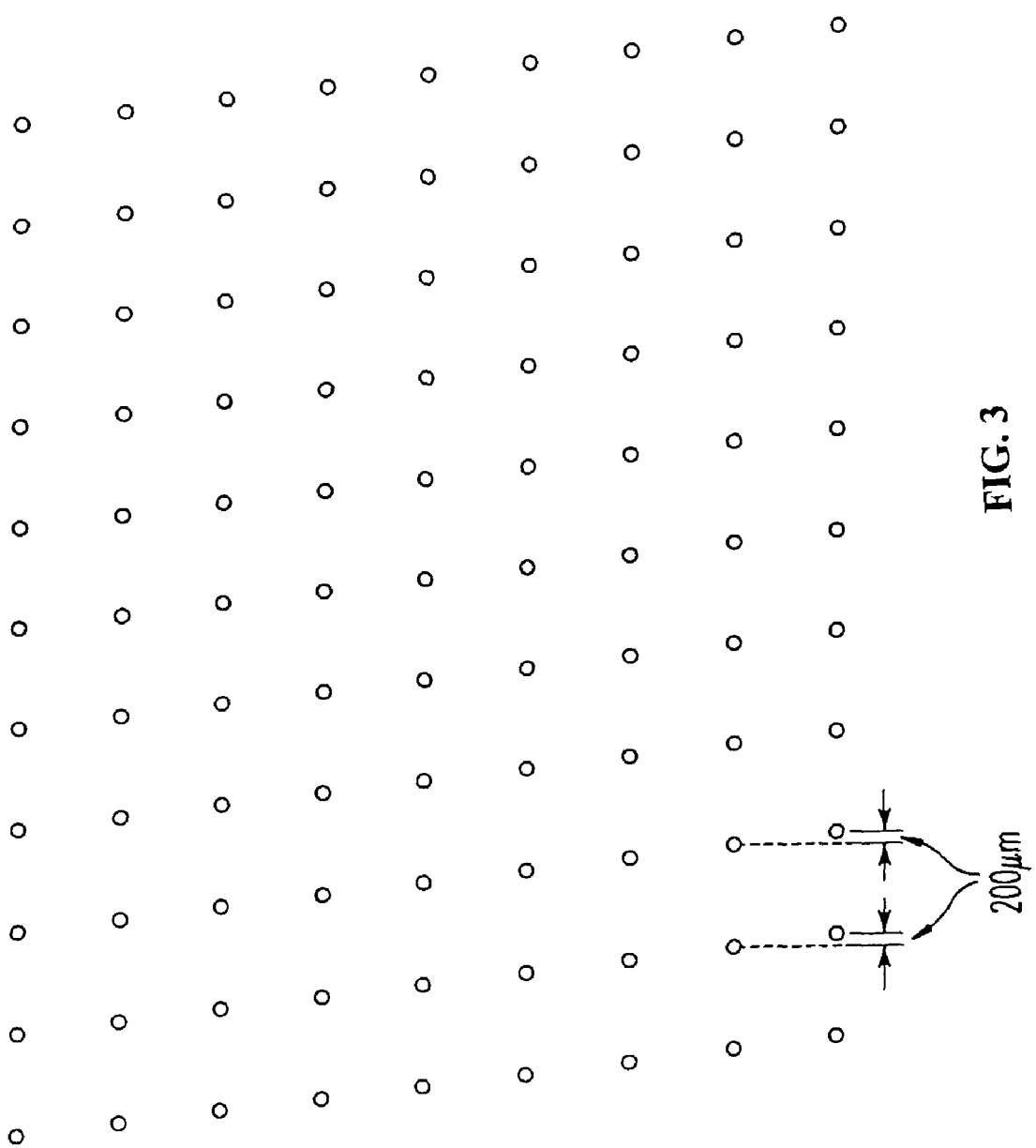
FIG. 3 is a schematic depicting a composite layout of the fields of view for the 99 microscopes depicted in FIGS. 2A and 2B.

FIG. 3 is a schematic depicting a composite layout of the fields of view for the 99 microscopes in the completed MA 30. Each field of view in FIG. 3 measures 250 μm in diameter and the horizontal spacing between adjacent fields of view is 1.78 mm. Scanning of the microscope slide beneath the MA 30 results in a composite field of view across the entire width of the microscope slide 28.

Figure 4A:
FIG. 4A is a schematic depicting a scanned section of the object.
Figure 4B:
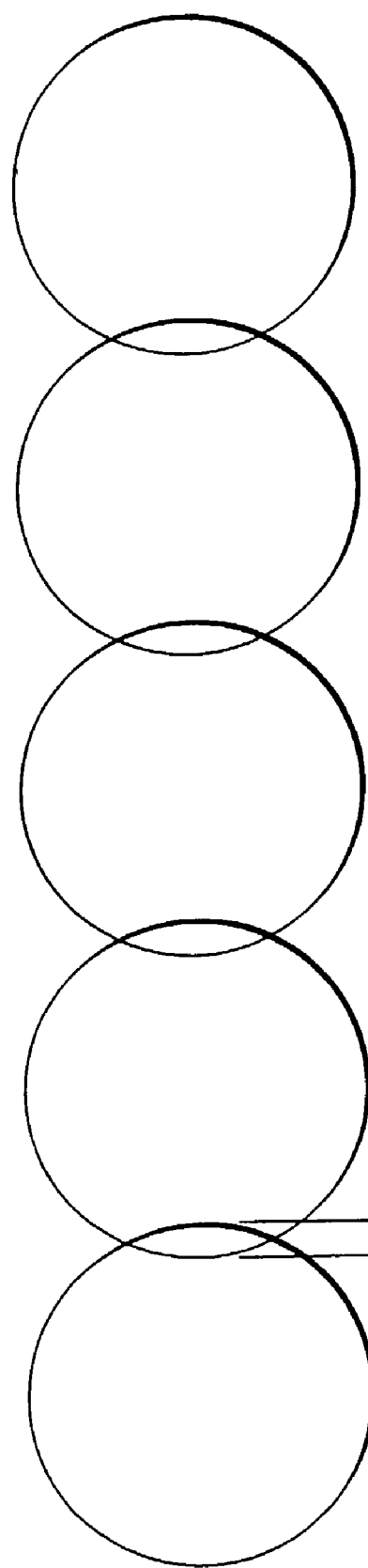
FIG. 4B is a schematic depicting a magnified section of FIG. 4A.

FIG. 4A is a schematic depicting a composite section of the object across the width of the object (i.e., orthogonal to the scan direction). FIG. 4B shows a magnified section of the scanned section. The microscopes 10 in the array 30 are spaced horizontally so as to produce a 50 μm overlap between adjacent microscopes' fields of view. The overlap can be adjusted, according to the present invention, by changing the center-to-center spacing between microscopes on the same row. Thus, a computer 32 (i.e., a concatenating device) concatenates a composite image of the specimen by registering in memory where all the images have been taken relative to a starting position and registering which microscope element in the array acquired the image. Once the MA scans the entire object, then the individual digital images can be concatenated by realizing where on the object each picture in memory was derived. By assembling the registered images in an ordered matrix representative of the position at which the images were taken, a composite image is generated. The computer controls a scan motor 33A and a height-adjustment motor 33B to coordinate the scanning process and to focus on a desired depth within or height on the object, respectively.

Control of distortion in every image is important for accurate concatenation of the recorded images into a composite image. Control of field-independent spherical-aberration types and field-dependent chromatic aberration types and astigmatic aberration types in the MA of the present invention is important to maintain height resolution across each recorded image. Field-dependent aberrations result, for example, in the center of an image being characterized by superior contrast than the periphery of the image. For concatenation of images along the row in FIG. 4B, field-dependent aberrations deteriorate the concatenated image quality. Further, any inaccuracies in spacing between optical axes of the array of microscopes may likewise deteriorate the composite image quality.

Figure 5:
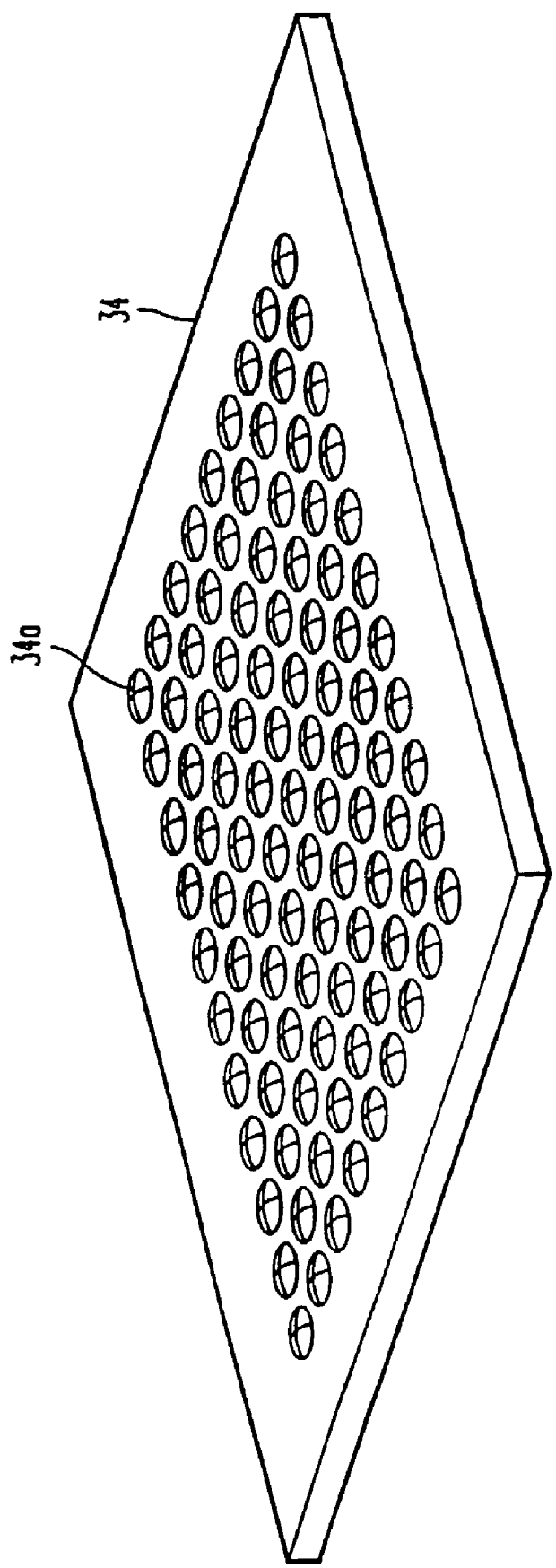
FIG. 5 is a schematic depiction of a refractive plate patterned with an array of lenslets.
Figure 6:
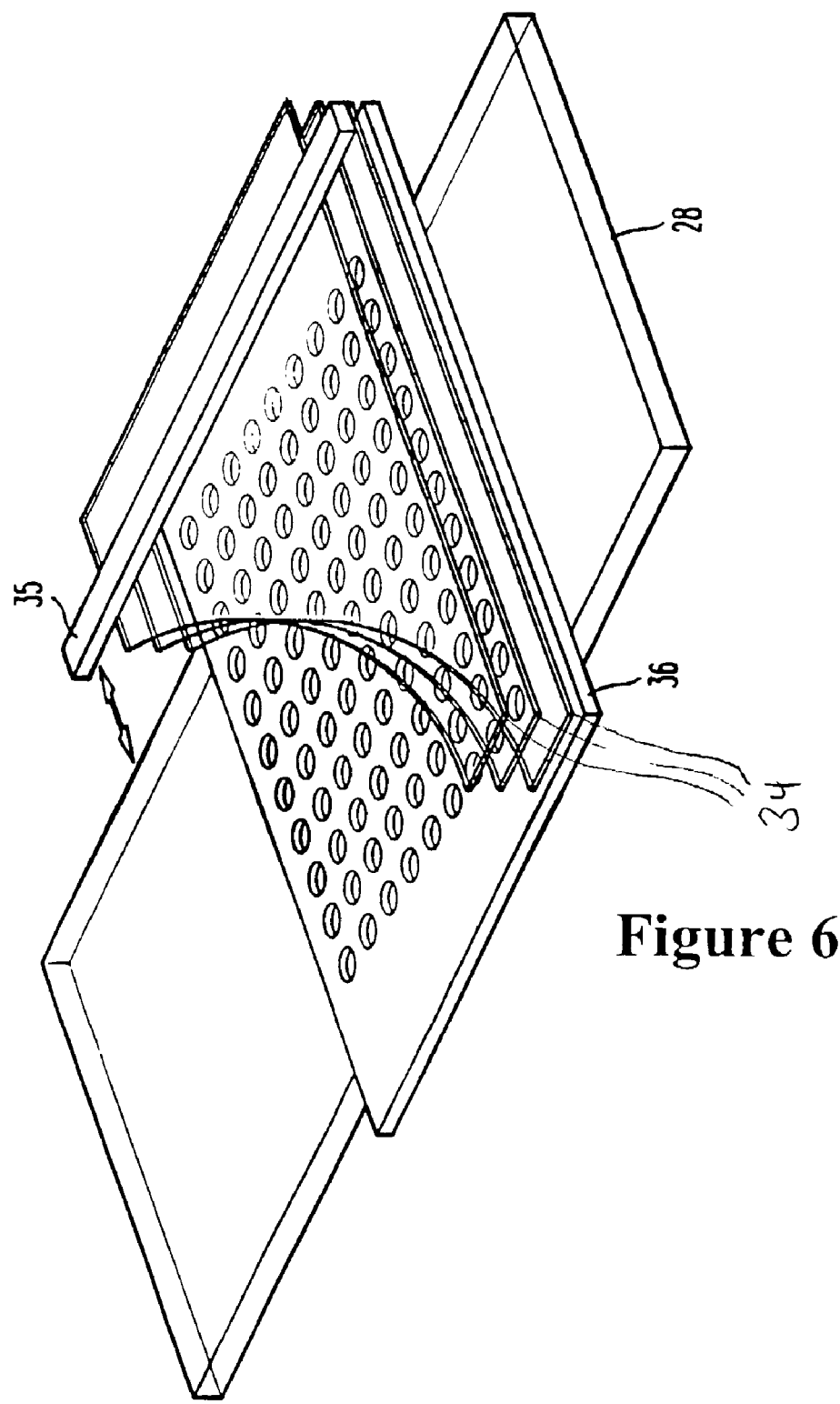
FIG. 6 is a schematic depiction of a composite base plate and three composite refractive plates.

In a preferred embodiment of the present invention, the refractive plates 16 are fabricated as a composite refractive plate 34 as shown in FIG. 5 that includes an array of printed optical elements 34a. The refractive plates can be lithographically printed, embossed, molded, or laser-printed with the corrective optical elements such as, for example, lenslets, aspherical lenses, diffractive components, and cubic phase plates. Further, the composite refractive plates 34 are stacked above a composite base plate 36 as shown in FIG. 6. The composite base plate 36 includes an array of embedded optical elements, such as for example the plano-convex objective lenses 12 depicted in FIGS. 3 and 5. The stacked set as shown in FIG. 6 is aligned with the optical elements 34a and the objective lenses 12 directly above each other. Also shown in FIG. 6, the image sensor is a linear photodetector array 35 located in an image plane of the MA. Scanning of the MA across the sample forms line-by-line images of the object which are concatenated into a composite image of the object. The linear photodetector array 35 can include multiple linear photodetector arrays. As used herein, an image sensing element is to be understood as referring to all or a portion of an array of photodetectors or other image sensor.

In another embodiment, the linear photodetector array 35 is configured tilted off an axis of the microscope in a staircase configuration, to permit imaging of objects at different depths into or above a surface of the object. In another embodiment of the present invention, the multiple linear photodetector arrays located in an image plane of the MA with each linear photodetector array having a spectral color filter or a spectral band-width filter such that scanning of the MA across the sample forms line-by-line images of the object which are concatenated into a composite color image of the object.

Digitally, a reconstructed digital image can be produced via a computer, for example the computer 32 shown in FIG. 2A. The computer utilizes processing techniques to produce the reconstructed digital image which are similar to those in Adler et al. U.S. Pat. No. 6,023,495 and George et al. U.S. Pat. No. 6,175,656, the entire contents of which are incorporated herein by reference.

In fabrication of the composite plates 34, 36, the optical elements 34a and the objective lenses 12 are formed, according to the present invention, by lithographically printing, embossing, molding, or laser-printing. Printing by lithography of the optical elements 34a provides for accurate dimensioning of the array of optical elements on the plate 34. Printing of the optical elements 34a by laser printing also provides accurate dimensioning of the array of optical elements 34a on the plate 34. Laser-printing in the present invention follows closely methods and techniques known in the field of laser printing such as for example techniques in Wyrowski and Turner, *Diffractive Optics for Industrial and Commercial Applications*, John Wiley & Sons; ISBN: 3527401008.

Printing of the optical elements 34a and the objective lenses of the present invention utilizes hybrid sol-gel materials (e.g., hybrid sol-gel glasses or hybrid glasses). Recent developments in hybrid sol-gel materials permit the formation and patterning of thicker optical elements as compared to non-hybrid sol-gel materials. The sol-gel process can be considered as a method for producing glass and ceramic materials from metallorganic precursors by low temperature polymerization reactions. For example, H. K. Schmidt, in "Sol-gel and polymer photonic devices," SPIE Critical Review, vol. CR68, pp. 192–203, 1995, discloses sol gel processing as a tool for making diverse optical materials. Furthermore, M. R. Descour, et al., in "Toward the development of miniaturized imaging systems for detection of pre-cancer," IEEE Journal of Quantum Electronics, vol. 38, No. 2 (February 2002), disclose the sol-gel method as a tool for making micro-optical elements such as lenslets.

One obstacle for the application of sol-gel inorganic materials into many optical devices has been the maximum attainable crack-free sol-gel glass thickness. Increased thickness is a prerequisite for increasing the optical power of any lithographically fabricated optical element. Fabrication of components with thicknesses greater than 1 µm based on oxygen-metal-oxygen sol-gel materials (i.e., non-hybrid sol gels) normally requires iterative cycles of deposition, baking at temperatures around 1000° C., and dry etching. However, hybrid sol-gels have been recently developed which incorporate organic groupings and reduce the connectivity of the sol-gel network, allowing thicker sol gel film deposition as compared to sol-gels which do not include the organic groupings. See for example Takei et al. in U.S. Pat. No. 5,871,558 and Assadi et al. in U.S. Pat. No. 6,150,653, the entire contents of both patents being incorporated herein by reference.

In the sol-gel technique of the present invention, the optical elements on a refractive plate 16 or a composite refractive plate 34 are defined using ultraviolet (UV) light in a single lithography step. The sol-gel process disclosed by Assadi et al. in U.S. Pat. No. 6,150,653, the entire contents of which are hereby incorporated by reference, and Rantala et al. in "Direct patterning of thick hybrid glass film for micro-opto-mechanical structures", Electronics Letters (2000), vol. 36, pp. 1–2, are similar to the process of the present invention. In one lithography step and using a grayscale photomask, a thick layer of hybrid sol-gel material is patterned with a diffractive, a reflective, or a refractive optical surface, or a combination thereof. In grayscale lithography, a spherical optical surface is as simple to fabricate as an arbitrary aspheric optical surface. To make a convex refractive lens, for instance, the hybrid sol-gel material will be spin-coated to form a 100 µm thick film on borosilicate glass substrates. After spinning, the films will be prebaked at 95° C. for 10 minutes to decrease the amount of solvents in the film. The baking step reduces the effect of photomask adhesion to the film and also improves the adhesion of the film to the glass substrate. Ultraviolet (UV) exposure can be accomplished by using a mercury UV lamp at a wavelength of 365 nm and a grayscale photomask.

Lithographically fabricated optical elements can be characterized interferometrically to measure the accuracy of the surface figure and to determine the surface roughness. The accuracy of the surface figure determines the optical elements' first-order properties, e.g., the focal length, and the aberrations introduced by the optical elements. The surface roughness determines the fraction of light that is scattered by the optical elements, leading to reduced throughput and reduced contrast due to stray light.

The scattering properties of the patterned hybrid sol-gel material can be further characterized in terms of a bi-directional scattering distribution function (BSDF). The BSDF determines the angular distribution of scattered light. The BSDF data can be used to increase the accuracy of modeling of the miniature microscopes and to improve MA designs by controlling stray light.

No etching of the patterned surface is necessary to create the optical structures of the present invention, thereby eliminating an expensive and time-consuming fabrication step.

Alternatively, the corrective elements 34a and the composite refractive plate 34 shown in FIG. 6 can be fabricated, according to the present invention, by molding or embossing. Embossing techniques similar to those techniques disclosed by Choquette et al. in U.S. Pat. No. 5,861,113, the entire contents of which are incorporated herein by reference, are suitable for the present invention. Molding techniques similar to those techniques disclosed by Yoshida et al. in U.S. Pat. No. 6,105,395 or by Nomura et al. in U.S. Pat. No. 5,976,425, are suitable for the present invention, the entire contents of these patents being incorporated herein by reference.

In the lithographic and embossing techniques of the present invention, the composite refractive plate 34 or the composite base plate 36, as shown in FIG. 6, is embossed or lithographically printed at the grid positions of each microscope element with an appropriate optical element such as for example an objective lens or aspherical corrector. In the molding technique according to the present invention, a mold produces a refractive plate with the appropriate optical elements molded at the proper grid positions. In any of the lithographic, embossing, and molding techniques, the relative positions of the appropriate optical elements, according to the present invention, may be controlled down to approximately 0.1 µm. As shown in FIG. 6, alignment of the stacked plates relative to each other defines the alignment of all the microscopes in the array. The materials of the composite refractive plate 34 or the composite base plate 36 can include silicon, glass, and plastics such as for, example, poly(methylmethacrylate).

Figure 7:
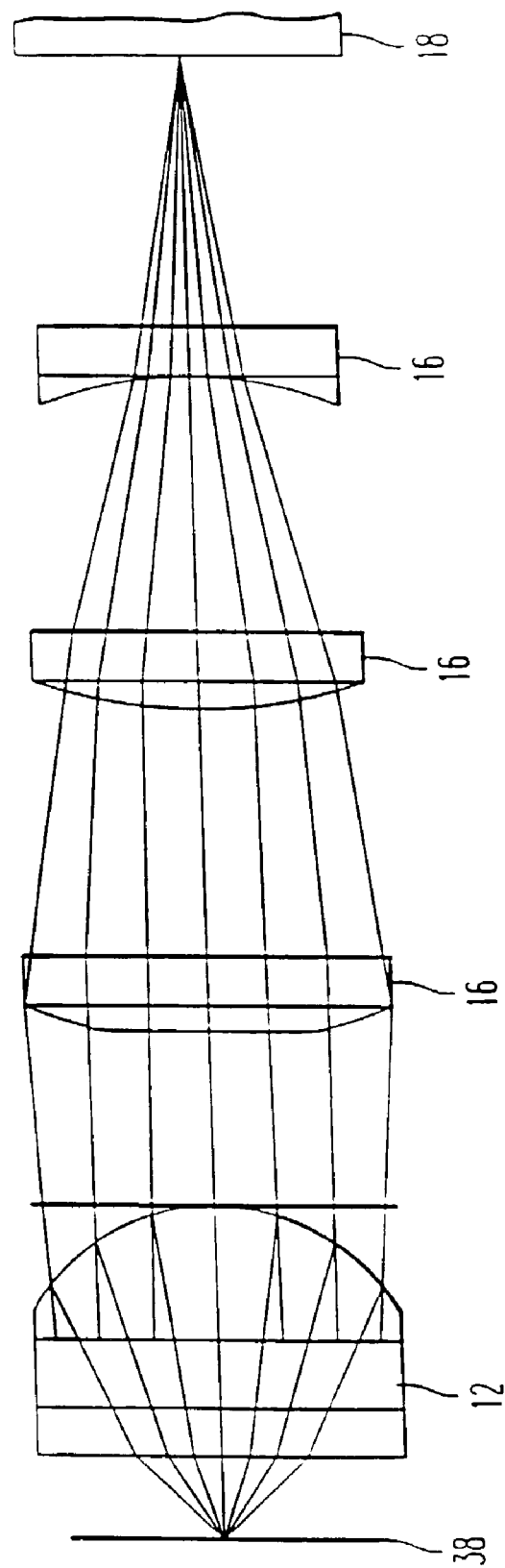
FIG. 7 is a schematic depiction of a high numerical aperture microscope objective.

In another embodiment of the present invention, a high-numerical aperture miniaturized microscope is utilized in the MA of the present invention. A high-numerical aperture is required for applications that require high-spatial resolution imaging. Performance of the MA of the present invention is enhanced by the use of a high-numerical-aperture, dry objective. FIG. 7 shows a design of a 0.7 NA miniature microscope objective. The 0.7 NA miniature microscope objective has a field of view of 250 µm in diameter. A working distance, measured from an object plane 38 to the front surface of the microscope objective 12, is 260 µm. The microscope objective 12 depicted in FIG. 7 operates at a 4× magnification (i.e., m=−4). The distance from the object plane to the image plane is 4.7 mm.

The 0.7 NA miniature microscope objective shown in FIG. 7 is designed for operation at 665 nm. Extension of the MA to function at other wavelengths is accommodated by adjusting the optical-design parameters for the index of refraction of the objective lens 12 and the remaining optical elements 16 in FIG. 7 for the desired wavelength of operation. If the high-numerical-aperture MA of the present invention is to be used at different wavelengths, the design parameters can be varied in an optical design program, such as for example ZEMAX®, to yield the best, diffraction-limited performance.

In the high-numerical aperture MA embodiment of the present invention, a first lens element 12 is a plano-aspheric lens. The first lens element is followed by three highly aspheric lens elements 16. In this embodiment, the first lens elements 12 (e.g., a plano-convex optical element) are mounted in a composite base plate 36. The three aspheric elements 16 are fabricated as arrays on stacked plates such as these stacked plates 34 shown in FIG. 6. The maximum thickness of the patterned hybrid sol-gel material for each aspheric lens element is 100 µm. The aspheric lens elements are patterned on a glass substrate of 150 µm thickness.

The high-numerical aperture design shown in FIG. 7 can, according to the present invention, be modified by replacing the first lens element 12 with a ball lens (i.e., a spherical lens) and modifying the shapes of the lens elements 16. Alternatively, the ball lens can be modified into a plano-convex lens by polishing the ball lens after mounting in the composite base plate 36. Alternatively, the ball lens surface can be changed into an aspherical lens by coating the mounted ball lens with a thin layer of a suitable patternable material and patterning the coated ball surface to a desired contour. Patterning may take place for example by the above-noted lithographic or embossing techniques.

Further, auto-focus techniques can be utilized in the MA of the present invention. In conventional microscopes, focus techniques have relied on motion of an entire lens relative to the object under inspection or motion of a lens element within a compound lens. In the context of the MA of the present invention, auto-focusing could utilize a refractive plate 16 having an electrically controllable index of refraction such as for example liquid-crystal (LC) or photorefractive materials. The degree of defocus could be determined directly from the imaged data. A correction signal based on the imaged data could be applied to electrically control the index of refraction to maintain the best focus.

Additionally, according to the present invention, a plate 34 could include an array of cubic-phase-plate optical elements. A cubic-phase-plate optical element is a device that enables the extension of an optical system's depth of field. In the present invention, the plate 34 including the cubic phase plate optical elements causes a blur within imaging system that is independent of an object's axial position. However, the images recorded by the computer 32 can be processed to remove the axial-position-independent blur. As a result of such computer processing, an image from an object having a highly contoured surface or a thick object will appear everywhere in focus. Such techniques utilizing a cubic phase plate device and methods for processing the data so obtained are disclosed in U.S. Pat. Nos. 5,748,371, 6,069,738, and 6,201,899, the entire contents of these patents being incorporated herein by reference.

Figure 8:
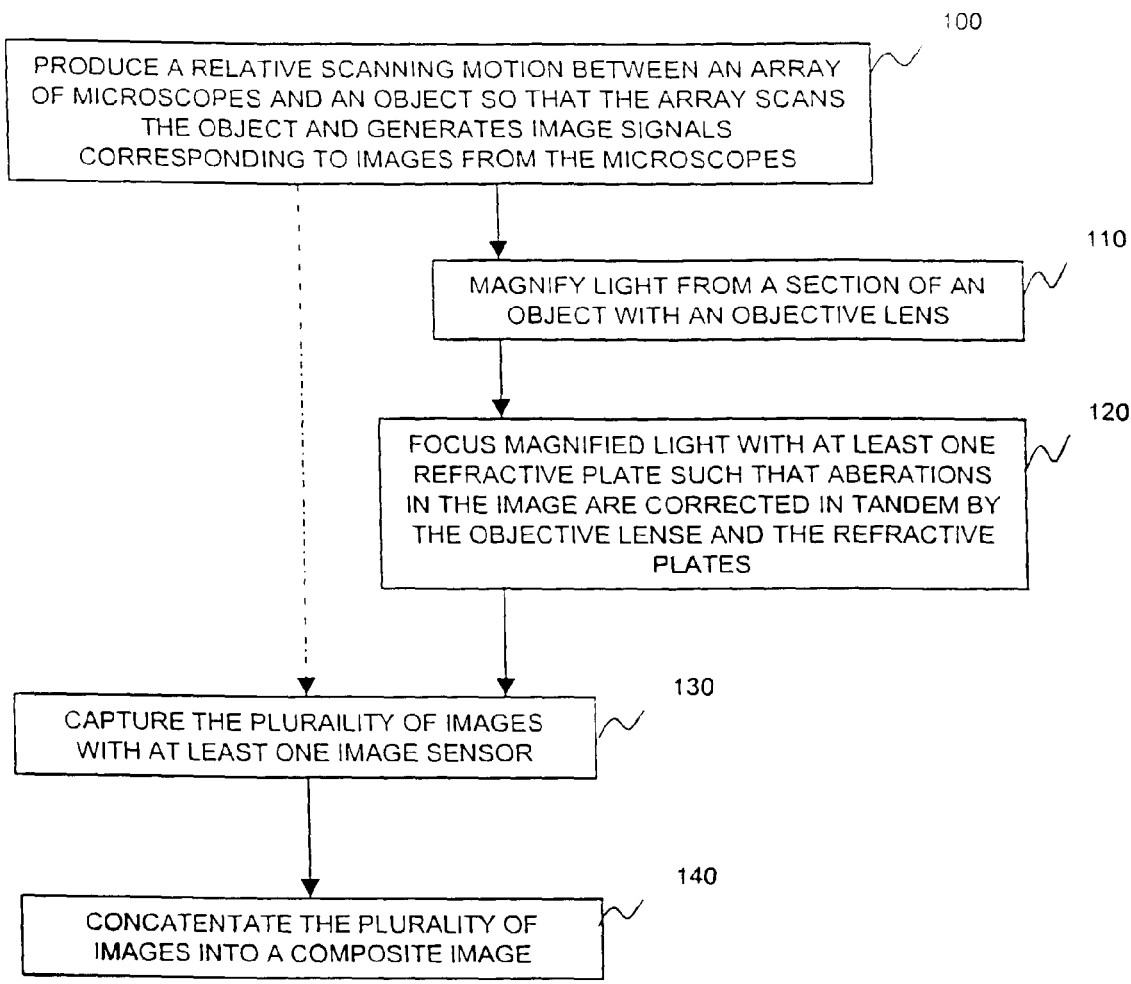
FIG. 8 is a flow chart illustrating imaging steps of the present invention.

FIG. 8 is a flow chart showing a method, according to the present invention, for imaging an object with a light microscope. At step 100, sections of an object are imaged with a microscope array of microscopes by producing a relative scanning motion between the array of microscopes and the object so that the array of microscopes scans the object longitudinally and generates a composite image signal corresponding to images from each microscope. At step 110, light is collected from a section of the object with an objective lens. Further at step 120, light from the objective lens is focused with at least one refractive plate adjacent to the objective lens such that the objective lens and the at least one refractive plate in tandem form an image from the section of the object and correct optical aberrations in the image from the section of the object. At step 130, the plurality of images are captured with at least one an image sensor located in an image plane of the microscope array. At step 140, the plurality of images is concatenated into a composite image.

The step of imaging at step 100 can include dry imaging with a numerical aperture ranging from NA=0.05 to NA<1.0, immersion imaging with a numerical aperture ranging from NA=0.05 to NA=0.95n, where n is the index of refraction of the immersion medium, imaging with a cubic phase plate located at a pupil plane of each microscope to focus an object with a height variation beyond a depth of field of any of the microscopes, imaging with a composite refractive plate having an electronically controlled refractive index to permit dynamic focusing of the microscopes, imaging with a linear photodetector array located in an image plane of the microscope array such that scanning of the microscope array across the object forms line-by-line images of sections of the object and concatenating the line-by-line images into a composite image, or imaging with multiple linear photodetector arrays located in an image plane of the MA with each photodetector array having at least one of a spectral color filter and a spectral band-width filter such that scanning of the MA across the sample forms line-by-line images of sections of the object and concatenating the line-by-line images into a color composite image. The step of imaging at step 100 involves at least one of translating the microscope array longitudinally along the length of the object and axially away from the object to form a composite three-dimensional image of the substrate, transilluminating the object, and epi-illuminating the object.

Figure 9:
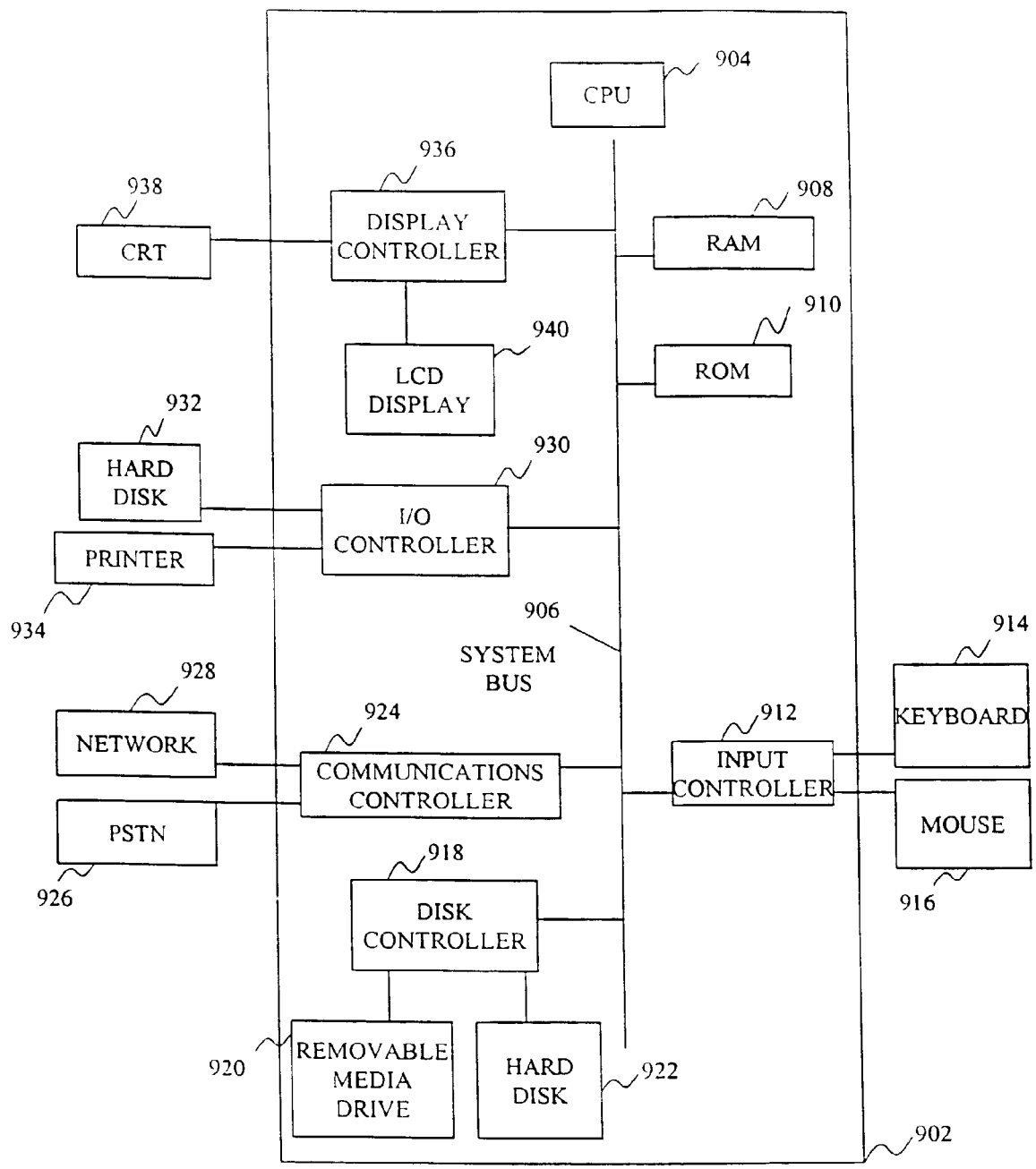
FIG. 9 is a schematic illustration of a computer system programmed to perform one or more of the special purpose functions of the present invention.

FIG. 9 is a block diagram of an exemplary computer 902 such as for example the computer 32 shown in FIG. 2A that may be programmed to perform one or more of the special purpose functions of the present invention, including controlling or directing some or part of the afore-mentioned method steps. The computer 902 is a personal computer, a portable computer, a computer workstation with sufficient memory and processing capability, or any device configured to work like a computer. In one embodiment, the computer 902 is a device diagrammatically shown in FIG. 9. In this embodiment, the computer 902 includes a central processing unit 904 (CPU) that communicates with a number of other devices by way of a system bus 906. The computer 902 includes a random access memory (RAM) 908 that stores temporary values used in implementing any one of the method steps of the present invention.

The central processing unit 904 is configured for high volume data transmission for performing a significant number of mathematical calculations in controlling the mass spectrometer of the present invention. A Pentium III microprocessor such as the 1 GHz Pentium III manufactured by Intel Inc. may be used for CPU 904. The processor employs a 32-bit architecture. Other suitable processors include the Motorola 500 MHZ Power PC G4 processor and the Advanced Micro Devices 1 GHz AMD Athlon processor. Multiple processors and workstations may be used as well.

A ROM 910 is preferably included in a semiconductor form although other read only memory forms including optical medium may be used to host application software and temporary results. The ROM 910 connects to the system bus 906 for use by the CPU 904. The ROM 910 includes computer readable instructions that, when executed by the CPU 904, perform different functions associated with controlling the mass spectrometer of the present invention. An input control 912 connects to the system bus 906 and provides an interface with various peripheral equipment including a keyboard 914 and a pointing device such as a mouse 916 settles to permit user interaction with graphical user interfaces. The input controller 912 may include different ports such as a mouse port in the form of a PS2 port or, for example, a universal serial bus (USB) port. The keyboard port for the input controller 912 can be in the form of a mini-DIN port although other connectors may be used as well. The input controller 912 may also include serial ports or parallel ports as well.

A disc controller 918 is in the form of an IDE controller and connects via driving cables to a removal media drive 920 which may be implemented as a floppy disc drive, as well as a hard disc drive 922 and a CD-ROM drive (not shown). In addition, a PCI expansion slide is provided on a disc controller 918, a motherboard that hosts the CPU 904. An enhanced graphic port expansion slot is provided and provides 3-D graphics with fast access to the main memory. The hard disc 922 may also include a CD drive that may be readable as well as writable. A communication controller 924 provides a connection to a network 928, which can be a local area network, wide area network, a virtual private network (VPN), or an extranet. The communications controller 924 can also provide a connection to a public switched telephone network (PSIN) 926 for providing Internet access. In one embodiment, the networks 928 and 926 and the communication controller 924 are connected by way of a plurality of connections including a cable-modem connection, digital subscriber line (DSL) connection, fiber optic connection, dial-up modem connection, and the like that connects to the communication controller 924.

An input/output controller 930 also provides connections to the external components such as an external hard disc drive 932, a printer 934, for example, by way of an RS 232 port and a CSI bus. The input/output controller 930 can be connected to the MA 30 of the present invention.

A display controller 936 interconnects the system bus 906 to a display device, such as a cathode ray tube (CRT) 938. The CRT can be used for display of the concatenated images as well as providing information about the operational status of the MA 30. While a CRT is shown, a variety of display devices may be used such as an LCD (liquid crystal display) 940, or a plasma display device.

The present invention thus also includes a computer-based product that may be hosted on a storage medium and include instructions that can be used to program a computer to perform a process in accordance with the present invention. This storage medium can include, but is not limited to, any type of disk including floppy disks, optical disks, CD-ROM, magneto-optical disks, ROMs, RAMs, EPROMs, EEPROMs, Flash Memory, Magnetic or Optical Cards, or any type of media suitable for storing electronic instructions.

This invention may also be conveniently implemented using a conventional general purpose digital computer programmed according to the teachings of the present specification, as will be apparent to those skilled in the computer art. Appropriate software coding can readily be prepared by skilled programmers based on the teachings of the present disclosure as will be apparent to those skilled in the software art. In particular, the computer program product controlling the operation of the MA of the present invention can be written in a number of computer languages including but not limited to C,C++, Fortran, and Basic, as would be recognized by those of ordinary skill in the art. The invention may also be implemented by the preparation of applications specific integrated circuits or by interconnecting an appropriate network of conventional component circuits, as will be readily apparent to those skilled in the art.

According to the present invention, when cross-talk among objectives is minimized, an array of imaging systems, such as a MA according to the present invention, shows improved imaging performance. The cross talk can be the result of scattered light, stray light, and/or overlapping images formed by each of the imaging systems.

Figure 10A:
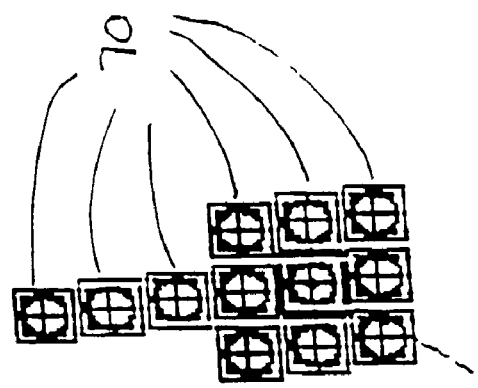
FIG. 10A is a top view of a 12-microscope subset of a microscope array showing a baffle array of the present invention.
Figure 10B:
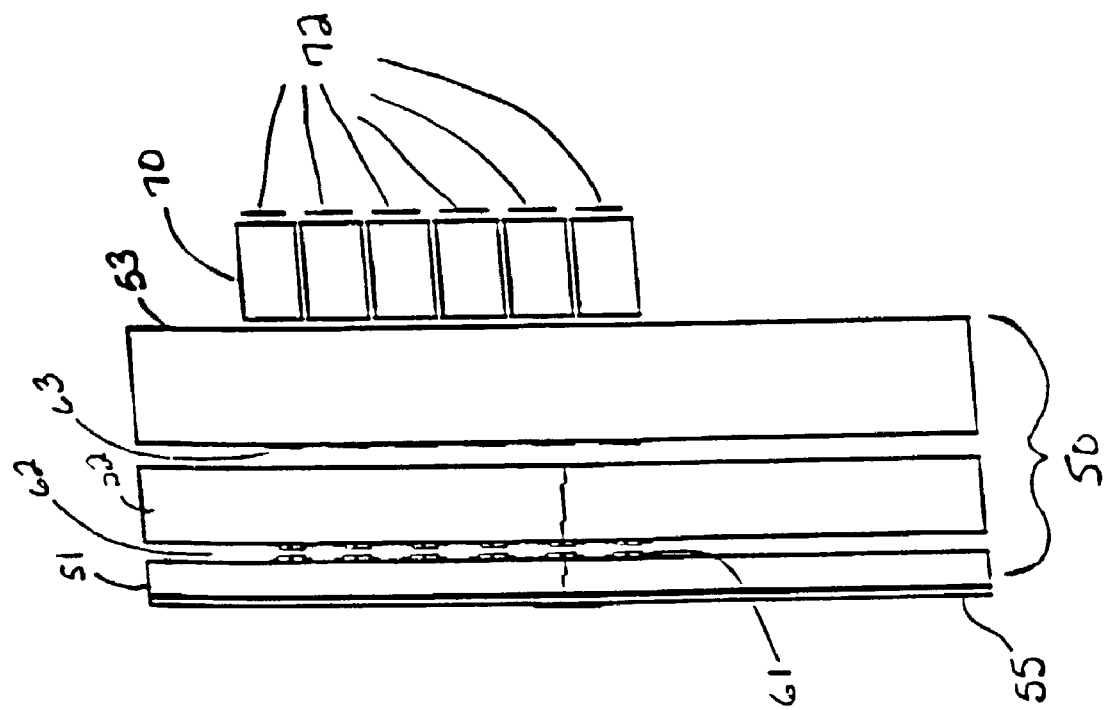
FIG. 10B is a side view of a 12-microscope subset of a microscope array of FIG. 10A showing a baffle array of the present invention.

Cross-talk is reduced, according to the present invention, by an array of baffles that block light that originates outside the field of view of an individual microscope (see FIGS. 10A and 10B). The field of view is defined herein as the projection of an image-plane image sensor or a segment of an image-plane image sensor associated with the microscope into an object space, e.g., into the object plane that is conjugate to the image plane.

FIG. 10A shows a top view of a miniature microscope array and baffle array according to the present invention. The view depicts a 12-microscope subset of the miniature microscope array layout showing a staggered arrangement similar to that shown in FIG. 2B.

FIG. 10B shows a side view of the aforementioned miniature microscope array and baffle. More specifically, FIG. 10B shows a side view of three substrates (i.e., the first substrate 51, the second substrate 52, and the third substrate 53). The first, second, and third substrates are configured with lenses similar to the three refractive plates 16 shown in FIG. 1. FIG. 10B shows that a microscope cover slip 55 beneath which a specimen to be imaged is located on one side of the first substrate 51. On an opposite side of the first substrate from the microscope cover slip 55 exists a first lens set 61. As shown in FIG. 10B, the second substrate is located between the first substrate 51 and the third substrate 53. On a side of the second substrate facing the microscope cover slip 55 exists a second lens set 62. The third substrate 53 includes a third lens set 63 located on a side of the third substrate facing the microscope cover slip 55. The third substrate is separated from a baffle array 70 shown in FIG. 10B. The baffle array is in turn separated from a set of image sensors 72.

Figure 11:
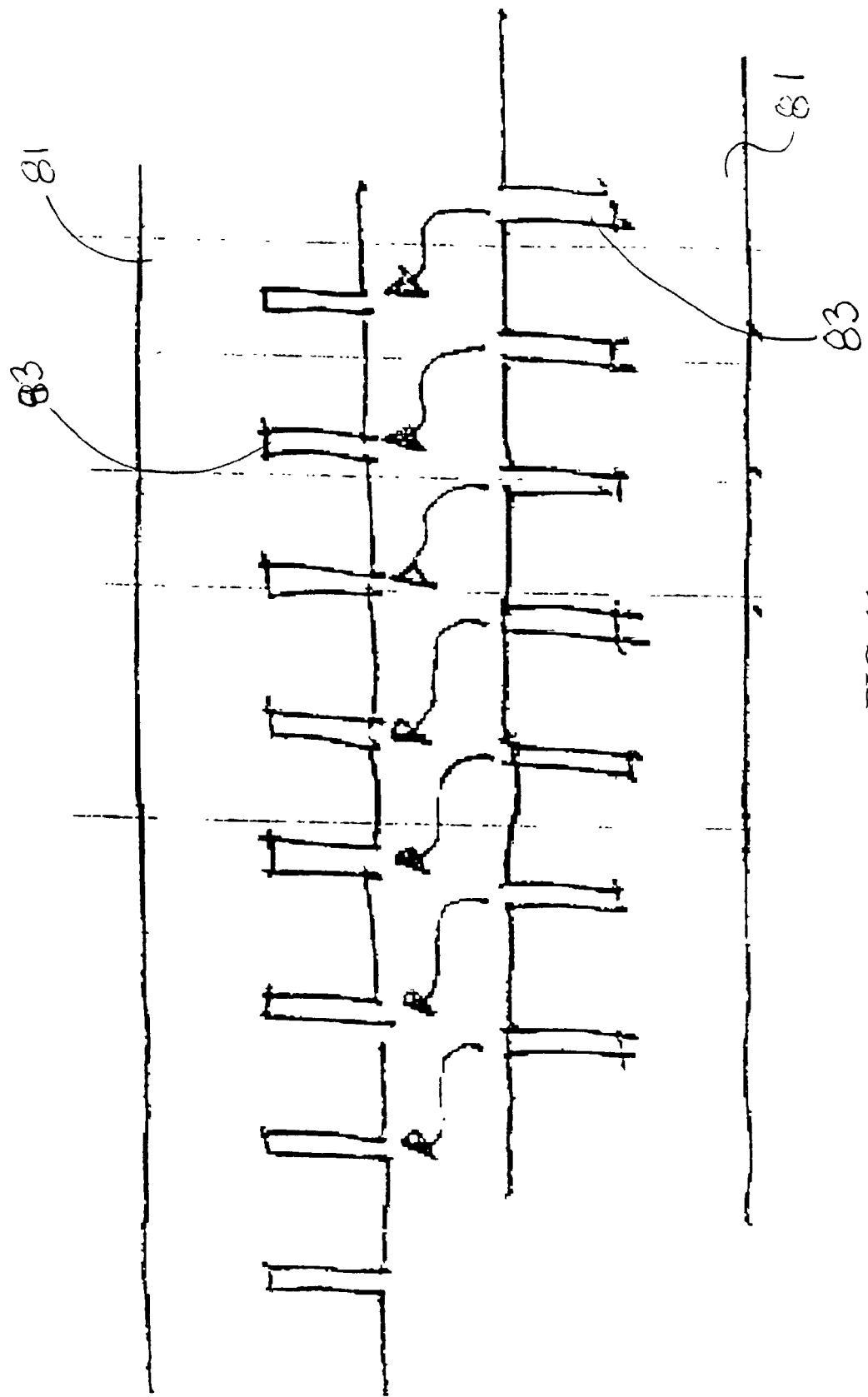
FIG. 11 is a depiction of a baffle array, according to the present invention, constructed from interlocking, light-absorbing panels.
Figure 12:
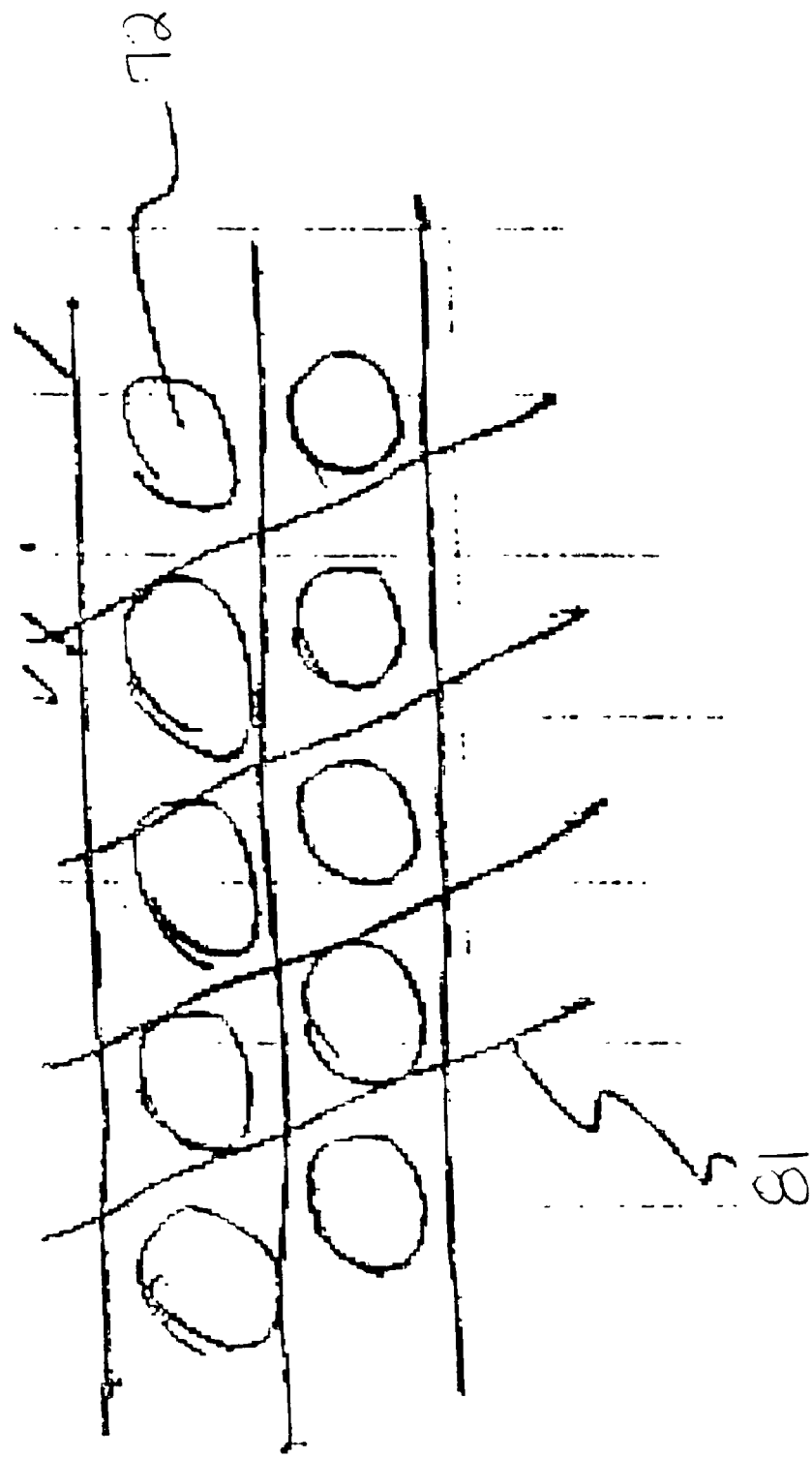
FIG. 12 is a top view of a sheared baffle array, according to the present invention, made from interlocking light-absorbing panels.
Figure 13:
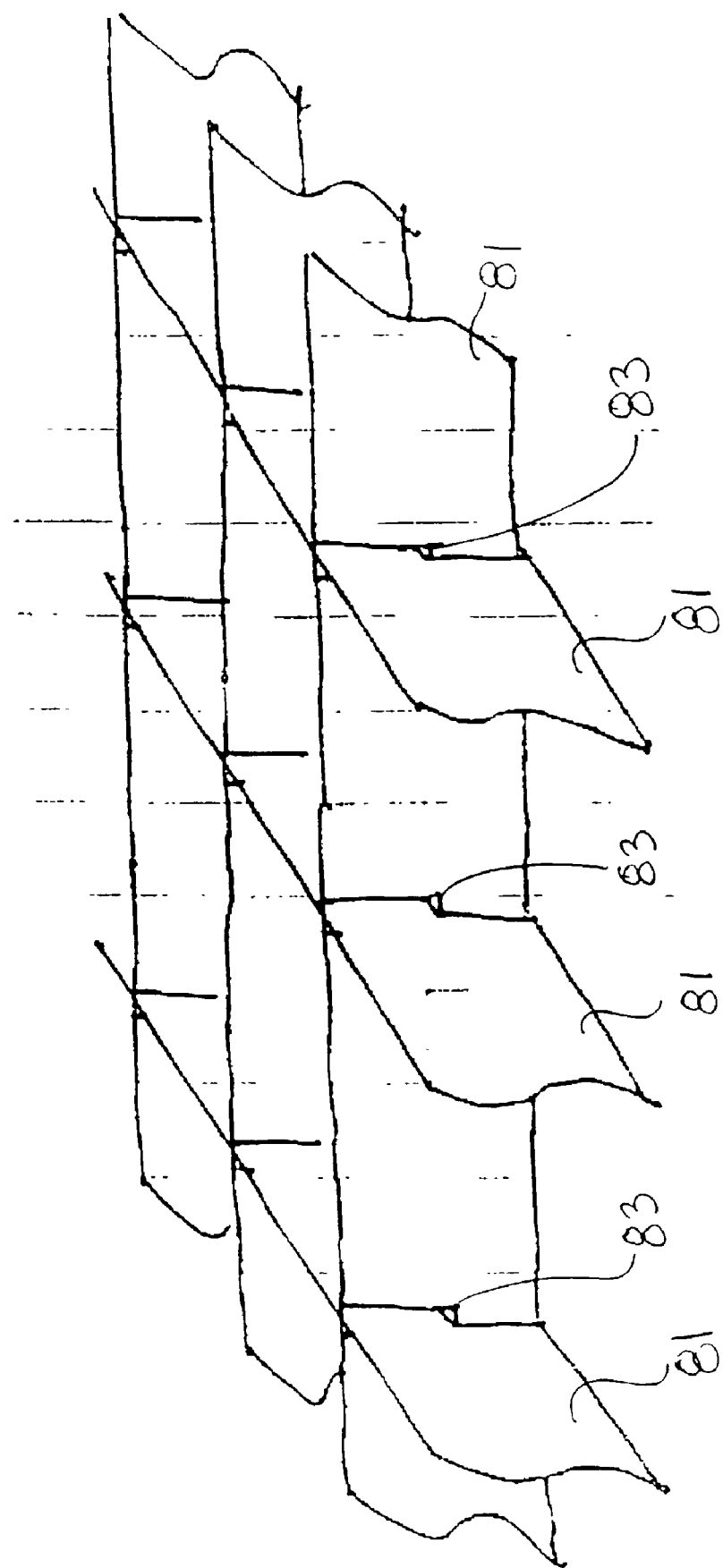
FIG. 13 is an isometric view of a segment of a baffle array, according to the present invention, constructed from interlocking light-absorbing panels.

In one preferred embodiment of the present invention, the baffle array can be constructed from interlocking, light-absorbing panels 81 (see FIG. 11). One advantage of this embodiment is that the interlocking panels 81 can be readily deformed by shearing to match a staggered array of miniature imaging systems. The panels are modified with complementary incisions 83 that are used to interlock the panels 81. FIG. 12 is a top view of a sheared or staggered baffle array, according to the present invention, made from interlocking light-absorbing panels 81. Within each region bounded on four sides by the panels 81 is shown an aperture 72 of an individual imaging element. FIG. 13 is an isometric view of a segment of the baffle array, according to the present invention, constructed from interlocking light-absorbing panels 81. The interlocking panels 81 can be made, according to the present invention, from sheet metal according to a computer design and cut using a focused laser beam. Other materials and other fabrication techniques are obviously also possible. The panels 81 are then assembled using the complementary incisions 83.

In one embodiment of the present invention, the panels may be anodized or coated with a medium which absorbs incident light in the wavelength range over which the image sensors respond to electromagnetic radiation. The medium selection can also be made by taking into account the behavior of the coating at large angles of incidence, so-called grazing angles of incidence.

Figure 14:
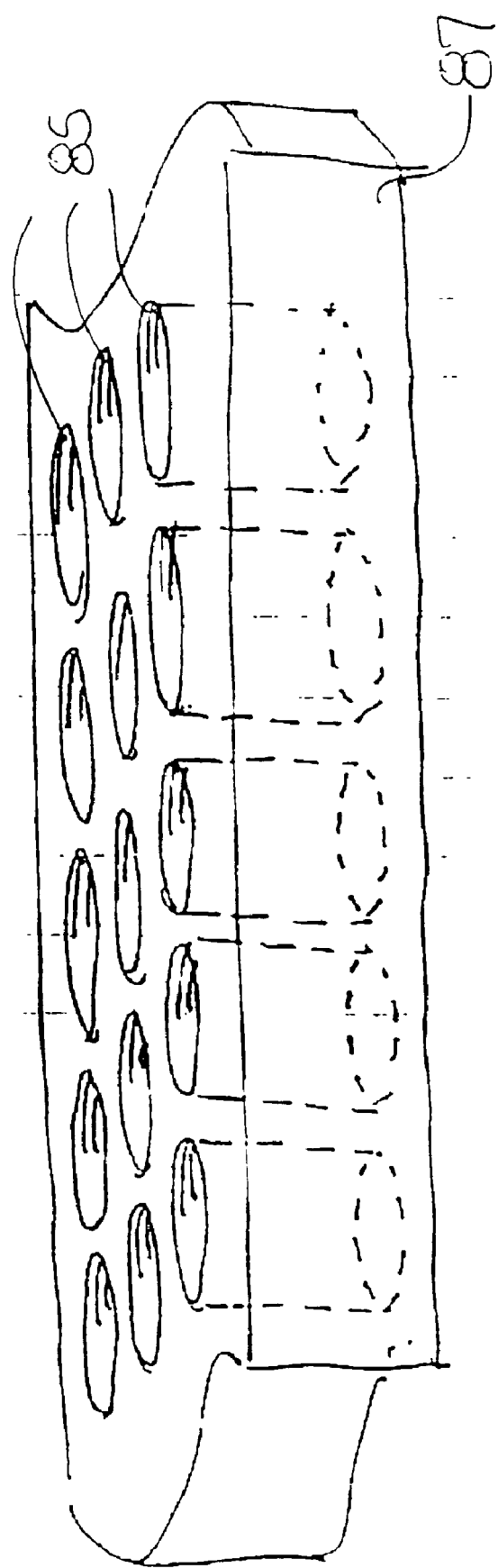
FIG. 14 is a depiction of a segment of a cylindrical baffle array, according to the present invention.

In another embodiment of the present invention, the baffle array can have a variety of baffle cross-section shapes. The shapes can be fabricated by injection molding. Examples of such shapes are cylindrical baffles (such as the cylindrical baffles 85 shown in FIG. 14), faceted baffles, rectangular baffles, and tapered baffles. FIG. 14 shows an example of a cylindrical-baffle array 85 of the present invention. The cylindrical-baffle array can be fabricated, for example, by injection molding. The baffle cross-section as a function of position along the optical axis of a given miniature imaging system can be described by an arbitrary function. For instance, an individual baffle may feature one or more constrictions that render the baffle more effective at blocking cross talk between arrayed imaging systems and the effects of stray light.

Figure 15:
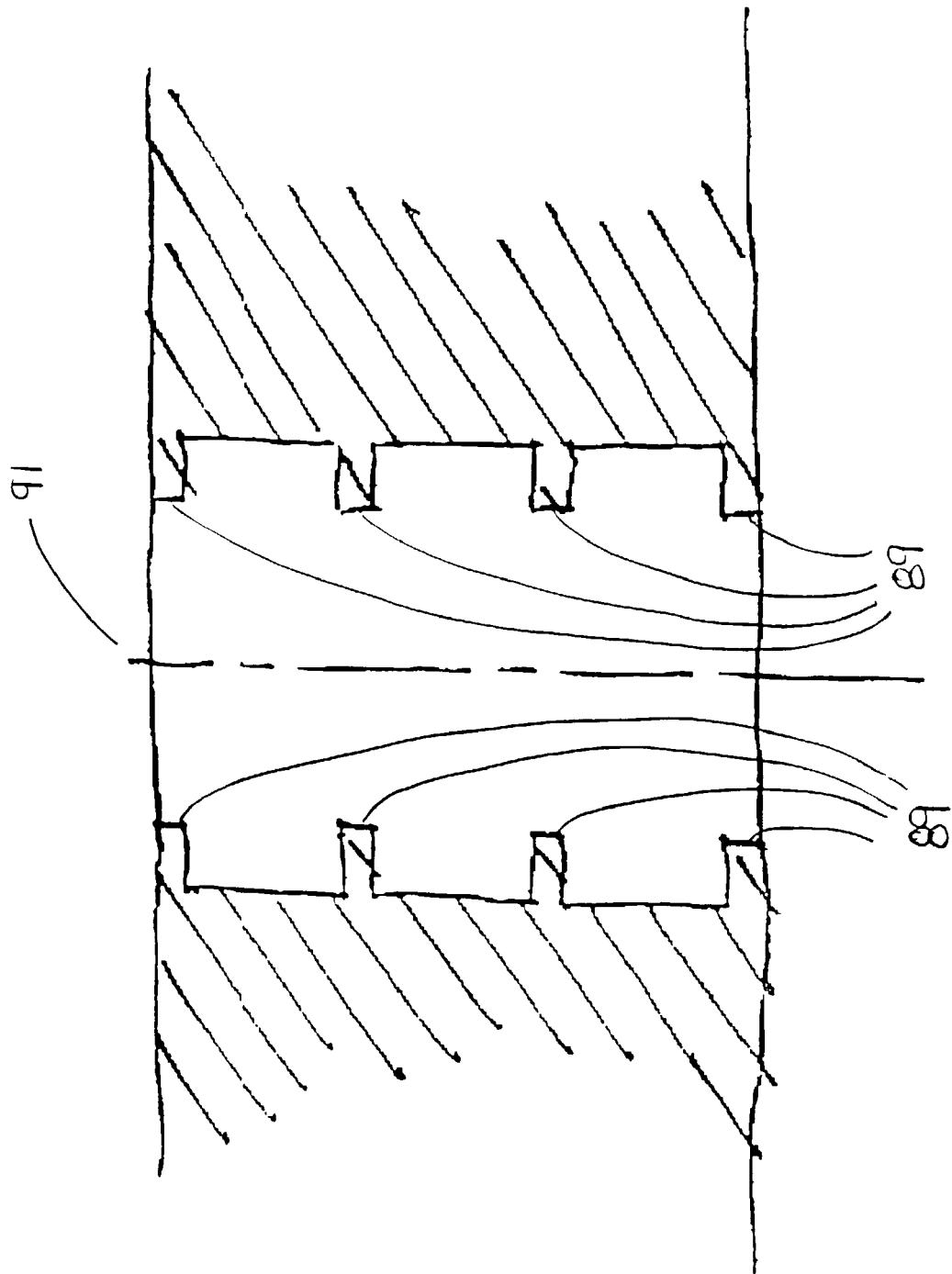
FIG. 15 is a depiction, according to the present invention, of a baffle cross-sectional variation along the optical axis of a given miniature imaging system.

FIG. 15 is a depiction, according to the present invention, of a baffle cross-sectional variation along the optical axis 91 of a given miniature imaging system. The baffle cross-section shows constrictions 89 that are added to further suppress crosstalk among arrayed imaging elements and the effects of stray light. Lithographic fabrication techniques such as LIGA can be used to fabricate the injection mold used in this embodiment of the present invention.

In another embodiment of the present invention, the baffle array can be fabricated by lithography. In this case, a mask with apertures (clear or opaque, depending on the tone of photosensitive material used) is used to define the layout and aperture shapes in the baffle array.

Fabrication may be performed in materials such as SU-8 (supplied by MicroChem Corp. (MCC) or by means of deep x-ray lithography or by means of LIGA (i.e. Lithographie, Galvanoformung und Abformung). LIGA is described in S. Kufner and M. Kufner, *Micro-optics and Lithography*, pp. 137–152 (VUB Press, 1997). LIGA, as well known in the art and as shown by the above-noted reference, provides a means for making precise molds or precise parts such as those required by the present invention. LIGA utilizes x-ray masks that define a cross-section of a part to be made. Using x-ray exposure and a precise photomask, the part can be made in a material such as poly(methylmethacrylate) (PMMA). Alternatively, parts made in PMMA can be electroplated to form a "negative" master of the desired part shape. The master can later be used to fabricate parts by hot pressing or injection molding of various PMMA grades, polyolefins, polycarbonates, liquid crystal polymers, or cyclic olefin copolymers (Topas). Parts formed in a resist such as PMMA directly by x-ray exposure or parts replicated by hot pressing or injection molding using a LIGA-generated master may be coated with a opaque or absorbing medium and subsequently form the baffle structures defined in the present invention. LIGA-generated parts can also readily incorporate precisely located alignment features to assist in alignment of the baffles to the imaging elements.

Figure 16:
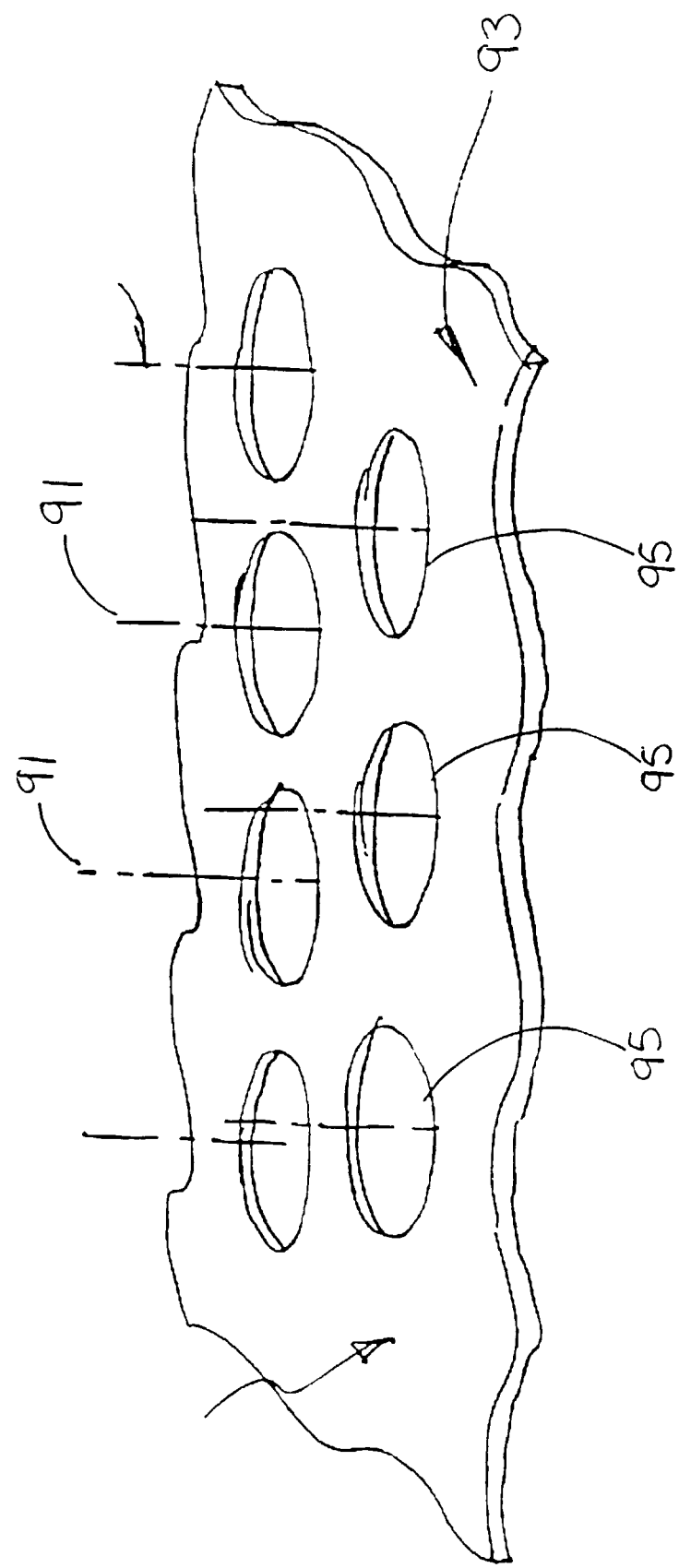
FIG. 16 is a depiction of a segment of an aperture array of the present invention.

In another embodiment of the present invention, a baffle array can be constructed from a stack of aperture arrays 93. FIG. 16 is a depiction of a segment of an aperture array of the present invention. The optical axes 91 shown in FIG. 16 are those corresponding to arrayed imaging systems. The area surrounding the aperture 95 on each aperture array is opaque to light. The aperture arrays can be fabricated by laser cutting of sheet metal. Each metal sheet is perforated with apertures 95. The metal sheets can be coated with a light-absorbing medium.

Figure 17:
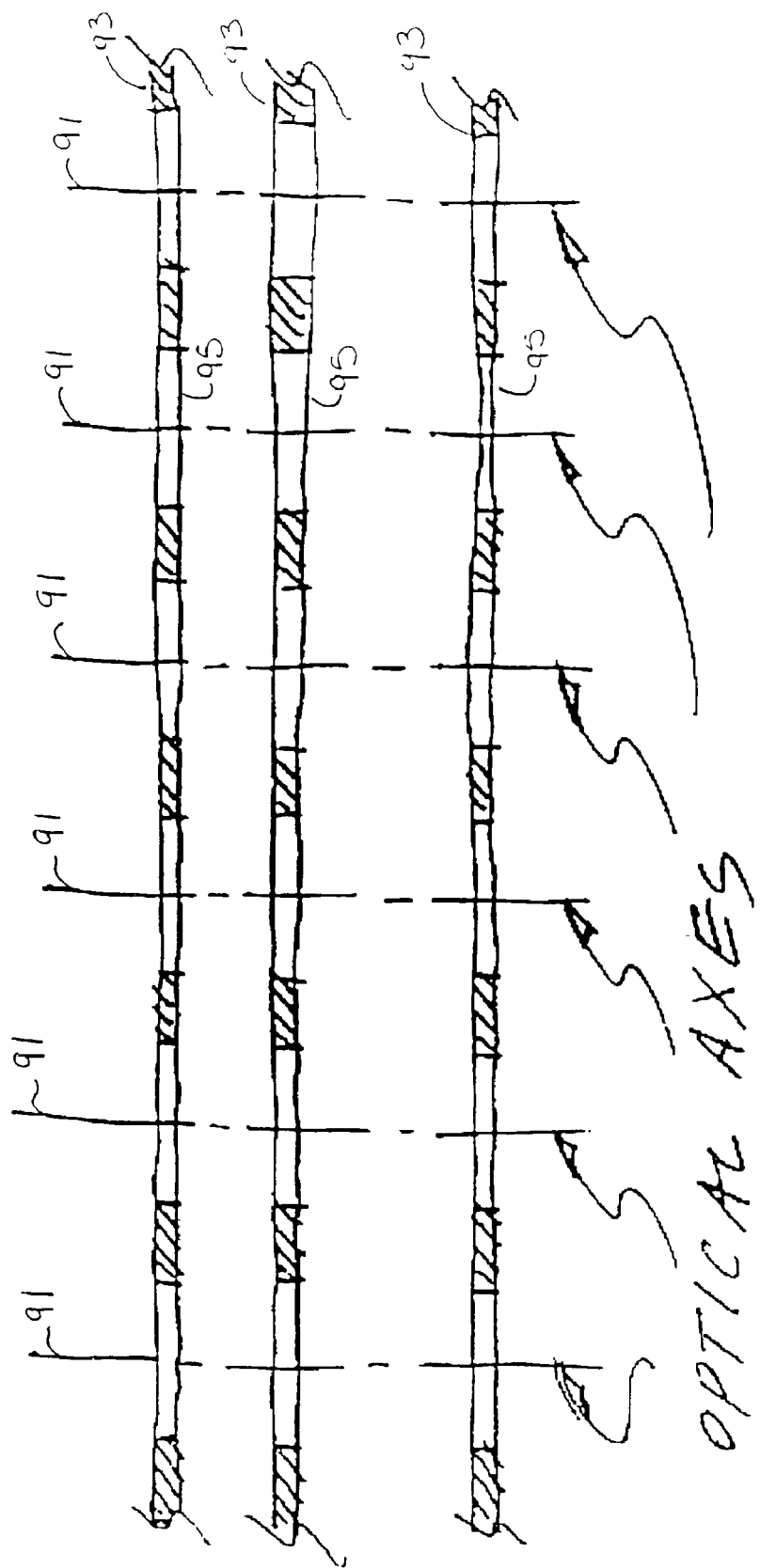
FIG. 17 is a depiction showing, according to the present invention, a stacking of the aperture arrays to form a baffle array.

FIG. 17 is a depiction showing, according to the present invention, a stacking of the aperture arrays. A side view of a segment of the stacked aperture arrays 93 is shown in FIG. 17. The optical axes 91 are those corresponding to arrayed imaging systems. Dashed regions indicate opaque parts of the aperture arrays. The metal sheets are stacked with an appropriate inter-aperture spacing. The spacing is determined based on, e.g., non-sequential ray-tracing analysis of the array of imaging systems. Non-sequential ray-tracing analysis may be also applied to determine the aperture 95 radii and the center-to-center aperture 95 spacings. In order to simplify the stacking of the aperture array, each array may comprise alignment aiding features.

Figure 18:
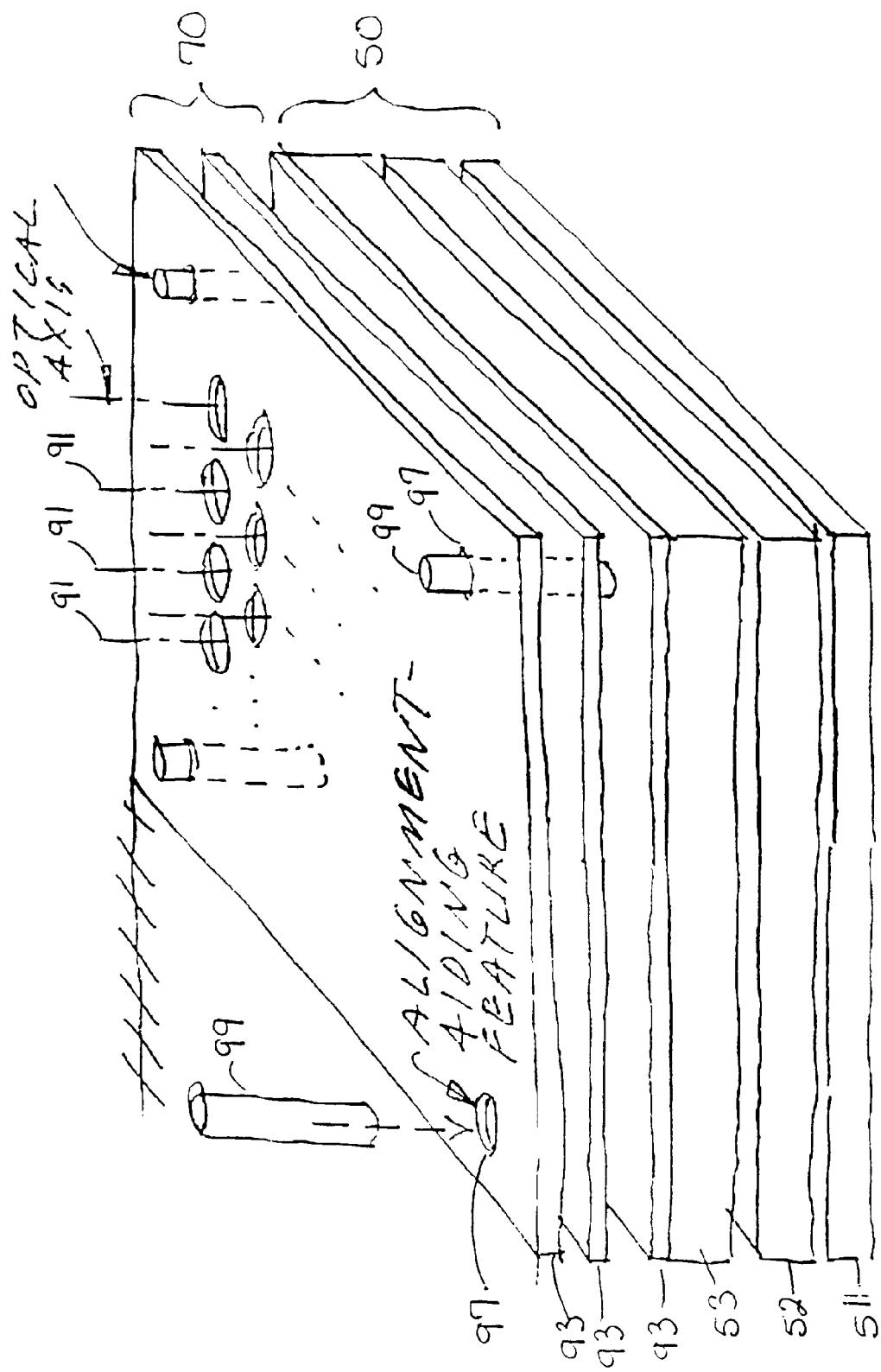
FIG. 18 is a depiction of a stacked aperture-array baffle array with alignment-aiding features, according to the present invention.

FIG. 18 is a depiction of a baffle array 70 made from stacked aperture arrays 93 with alignment-aiding features 97, according to the present invention. One example of such an alignment-aiding feature 97 is a series of circular apertures that allow the metal sheets 93 of this embodiment to be stacked using a set of alignment pins 99 that are in turn aligned with the array of imaging systems 50 constructed using substrates 51, 52, and 53.

Figure 19:
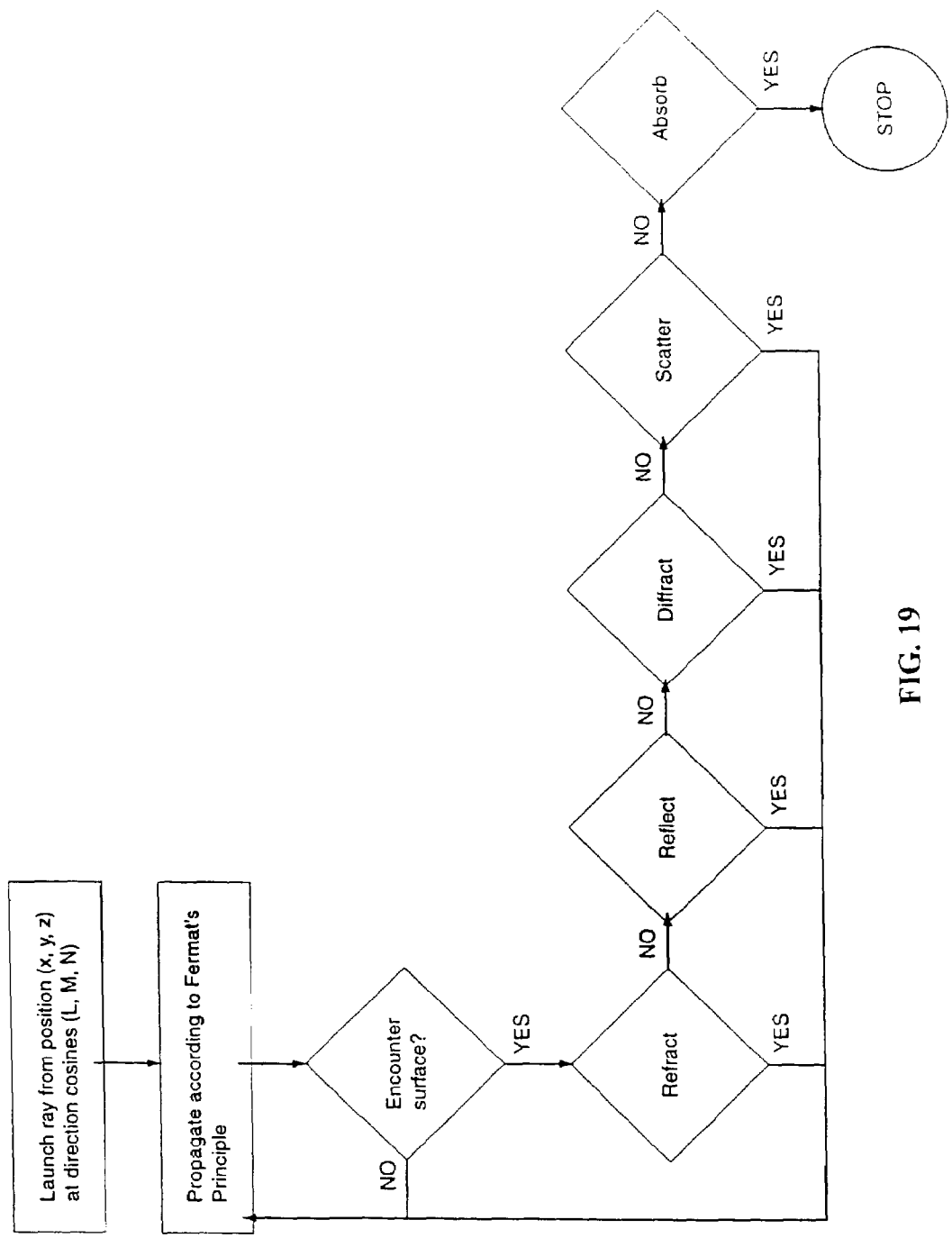
FIG. 19 which is a flow diagram illustrating the ray-tracing analysis of the present invention.

The baffle device of the present invention has been demonstrated by analytical examples using non-sequential ray-tracing performed in an optical design program for optimizing, tolerancing, and analyzing sequential imaging systems, and for modeling and analyzing general non-sequential systems offered by Focus Software, Inc., Tucson, Ariz., under the trademark ZEMAX®. The sequence of the ray tracing analysis is shown in FIG. 19 which is a flow diagram illustrating the analysis process of the present invention.

In the above analysis, a 12-objective array was laid out in ZEMAX for non-sequential ray-trace analysis using the layout depicted in FIGS. 10A and 10B. The substrates in the models measure 20 mm by 20 mm. The layout was constructed without ports and consists of an object plane, the non-sequential component (NSC) system, and the image plane. The source was modeled as a square whose side dimension equaled the spacing between adjacent imaging systems. In this case, the source measured 1.6 mm on a side. The image plane was divided into 12 image-sensor regions, each one square in shape and 1 mm on a side. Each of the image sensors was centered on the optical axis of the corresponding imaging system.

The source was modeled as exhibiting a Gaussian angular distribution. The ZEMAX manual defines such a bivariate distribution as $$I(L,M) \approx I_0 e^{-(G_x L^2 + G_y M^2)},$$

where L and M represent direction cosines of a ray in the X and Y axis directions and $G_x$ and $G_y$ are constants.

The modeling described used the following parameter values: $G_x = G_y = 0.1$. In terms of a more conventional definition, these parameters correspond to a standard deviation of $\sigma_x = \sigma_y = 2.23$. Since the direction cosines are confined to the range [−1,1], a standard deviation of this magnitude approximates a source with uniform angular distribution.

Figure 20:
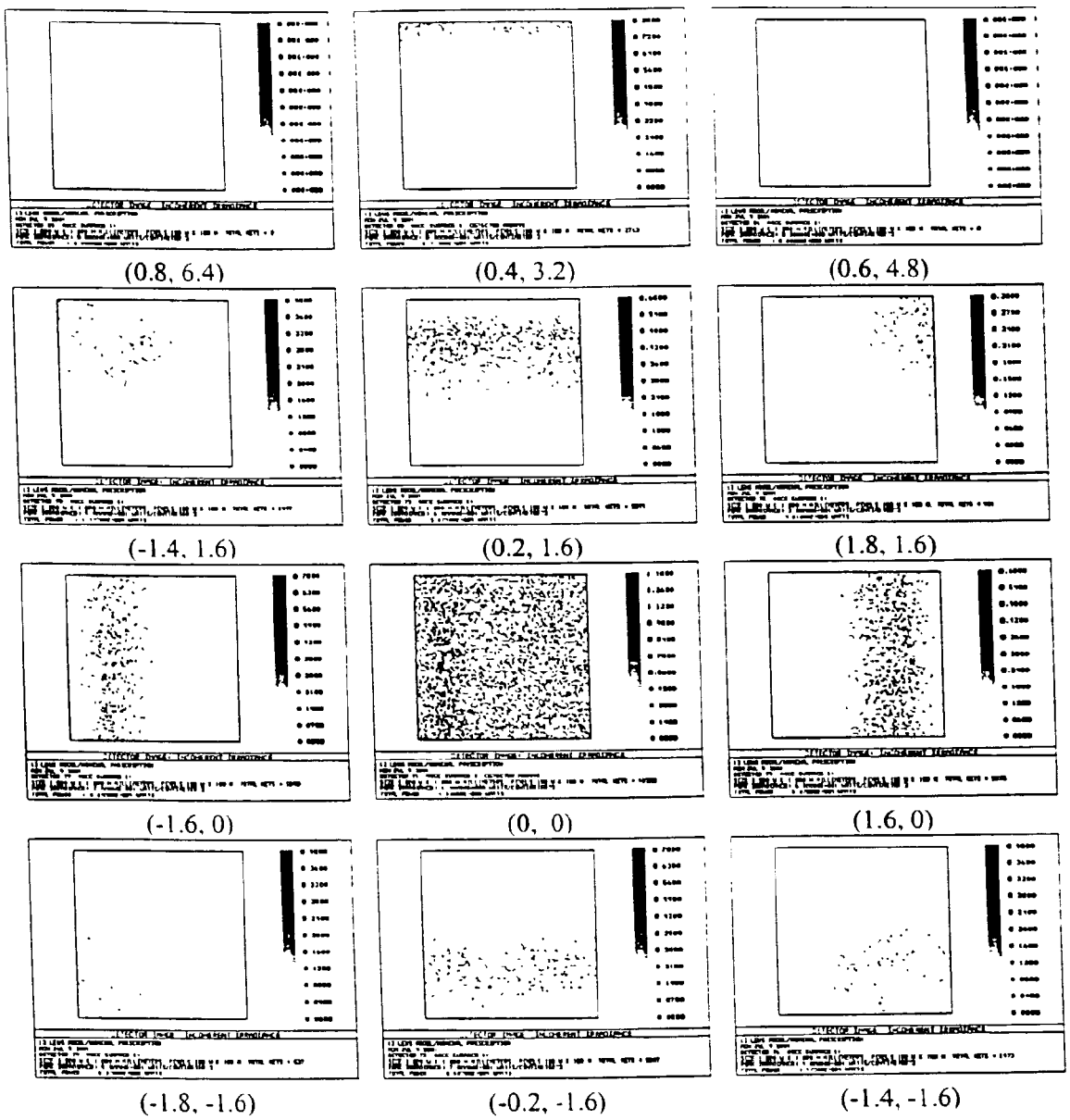
FIG. 20 is a depiction of irradiance distributions across each of the 12 modeled detectors in the MA image plane, using a baffle array according to the present invention.

One feature in this example is the thickness of a last lens substrate (e.g. the last refractive plate 16 shown in FIG. 1 to refract to the image sensor 18 or the third substrate 53 in FIG. 10) is 3 mm. The analysis results are shown in FIG. 20. FIG. 20 is a depiction of irradiance distributions across each of the 12 modeled image sensors in the MA image plane. Each part of FIG. 20 is labeled with the center coordinates of the represented image sensor. The coordinates are measured in millimeters in the MA image plane. The extended source is centered on (0, 0). The layout of the detector images matches the layout of objectives in FIG. 10A. The results in FIG. 20 are based on tracing 10,000,000 rays through the system shown in FIG. 10.

The baffles in this example of a baffle array are 2.5 mm long along each imaging system's optical axis. The baffles have a rectangular cross-section and absorbing side walls. The baffle-aperture dimensions are 1.4 mm by 1.4 mm. The gap between the last lens substrate 53 and the baffle array 70 is 200 microns. The gap between the baffle array 70 and the image sensors 72 is 252 microns.

The power emitted from the source is 1 W. This value is the result of integration over area and angle. The power integrated over the image-sensor area aligned with the source area is 4.03 mW. The next highest level of area-integrated power is found in the image sensors adjacent to that image sensor centered on the source: (−1.6, 0), (0.2, 1.6), (−0.2, −1.6), (1.6, 0) mm. The area-integrated power on those image sensors is 590 µW.

Figure 21:
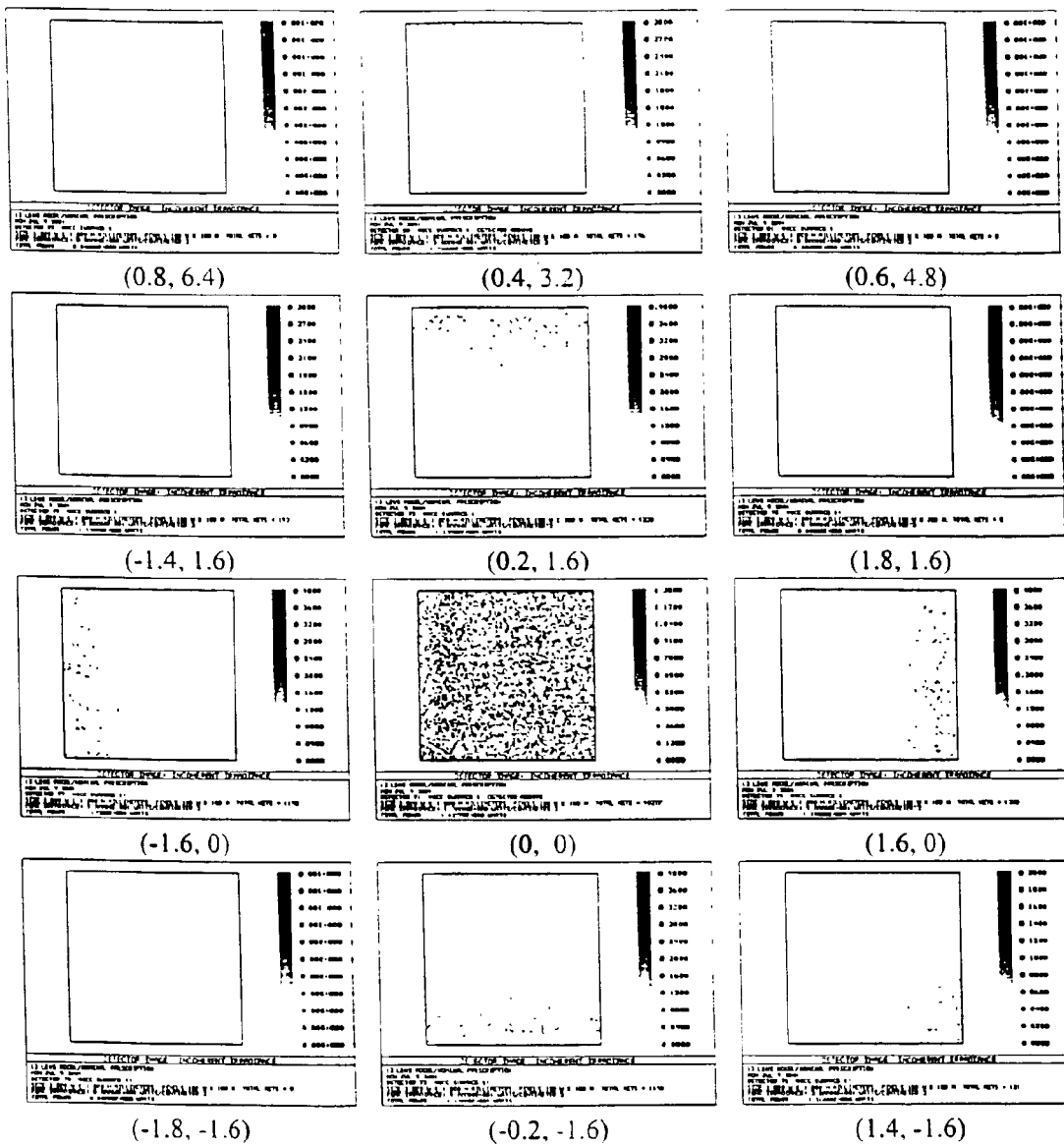
FIG. 21 is a depiction of irradiance distributions across each of the 12 modeled detectors in the MA image plane, using a lengthened-baffle array, according to the present invention.

In another example, the nominal prescription was modified by reducing the thickness of the last lens substrate 53 to 2 mm and re-optimizing the design of an individual imaging system using ZEMAX. The analysis results are shown in FIG. 21. FIG. 21 is a depiction of irradiance distributions across each of the 12 modeled image sensors 72 in the MA image plane. Each part of the FIG. 21 is labeled with the center coordinates of the represented image sensor. The coordinates are measured in millimeters. The extended source is centered on (0, 0). FIG. 21 presents results for an analysis example with a 2-mm thick lens substrate 53. The results in FIG. 21 are based on tracing 10,000,000 rays through the system shown in FIG. 10.

The baffles in the lengthened baffle-array design according to the present invention, are 3.2 mm long. The baffles have a rectangular cross-section and absorbing side walls. The baffle-aperture dimensions are 1.4 mm by 1.4 mm. The gap between the lens substrate 53 and the baffle array 70 is 200 microns. The gap between the baffle array 70 and the image sensors 72 is 207 microns.

The power emitted from the source is 1 W. This value is the result of integration over area and angle. The power integrated over the area of the image sensor aligned with the source area is 4.03 mW. The next highest level of area-integrated power is found in the image sensors adjacent to that image sensor centered on the source: (−1.6, 0), (0.2, 1.6), (−0.2, −1.6), (1.6, 0) mm. The area-integrated power on those image sensors is 120 µW.

Figure 22:
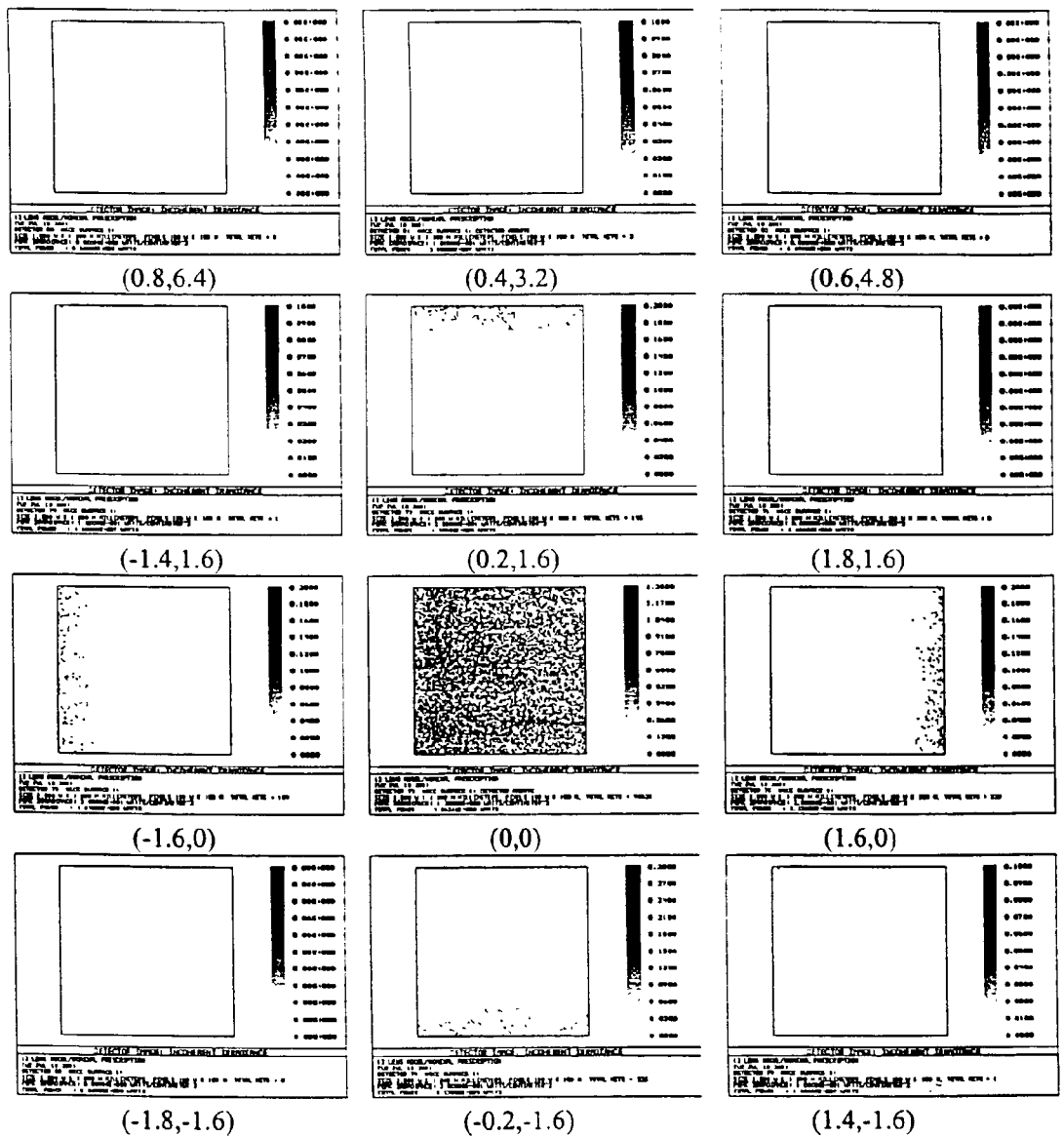
FIG. 22 is a depiction of irradiance distributions across each of the 12 modeled detectors in the MA image plane, using a narrow-width baffle array according to the present invention.

In another example, the nominal imaging-system prescription was modified by reducing the thickness of the last lens substrate 53 to 2 mm and re-optimizing the design of an individual imaging system using ZEMAX. The analysis results are shown in FIG. 22. FIG. 22 is a depiction of irradiance distributions across each of the 12 modeled image sensors 72 in the MA image plane. Each part of the FIG. 22 is labeled with the center coordinates of the represented image sensor. The coordinates are measured in millimeters. The extended source is centered on (0, 0). FIG. 22 presents results for an analytical example with a 2-mm thick lens substrate and 1.2 mm wide square baffles. The results in FIG. 22 are based on tracing 10,000,000 rays through the system shown in FIG. 10.

The baffles which are modeled as rectangular pipes with absorbing sidewalls were narrowed to 1.2 mm on a side. In the previous sections, the baffles measured 1.4 mm on a side. The spacing between imaging systems has remained 1.6 mm.

The power emitted from the source is 1 W. This value is the result of integration over area and angle. The power integrated over the area of the image sensor aligned with the source area is 4.03 mW. The next highest level of area-integrated power is found in the image sensors adjacent to that image sensor centered on the source: (−1.6, 0), (0.2, 1.6), (−0.2, −1.6), (1.6, 0) mm. The area-integrated power on those detectors is 22 µW.

Figure 23:
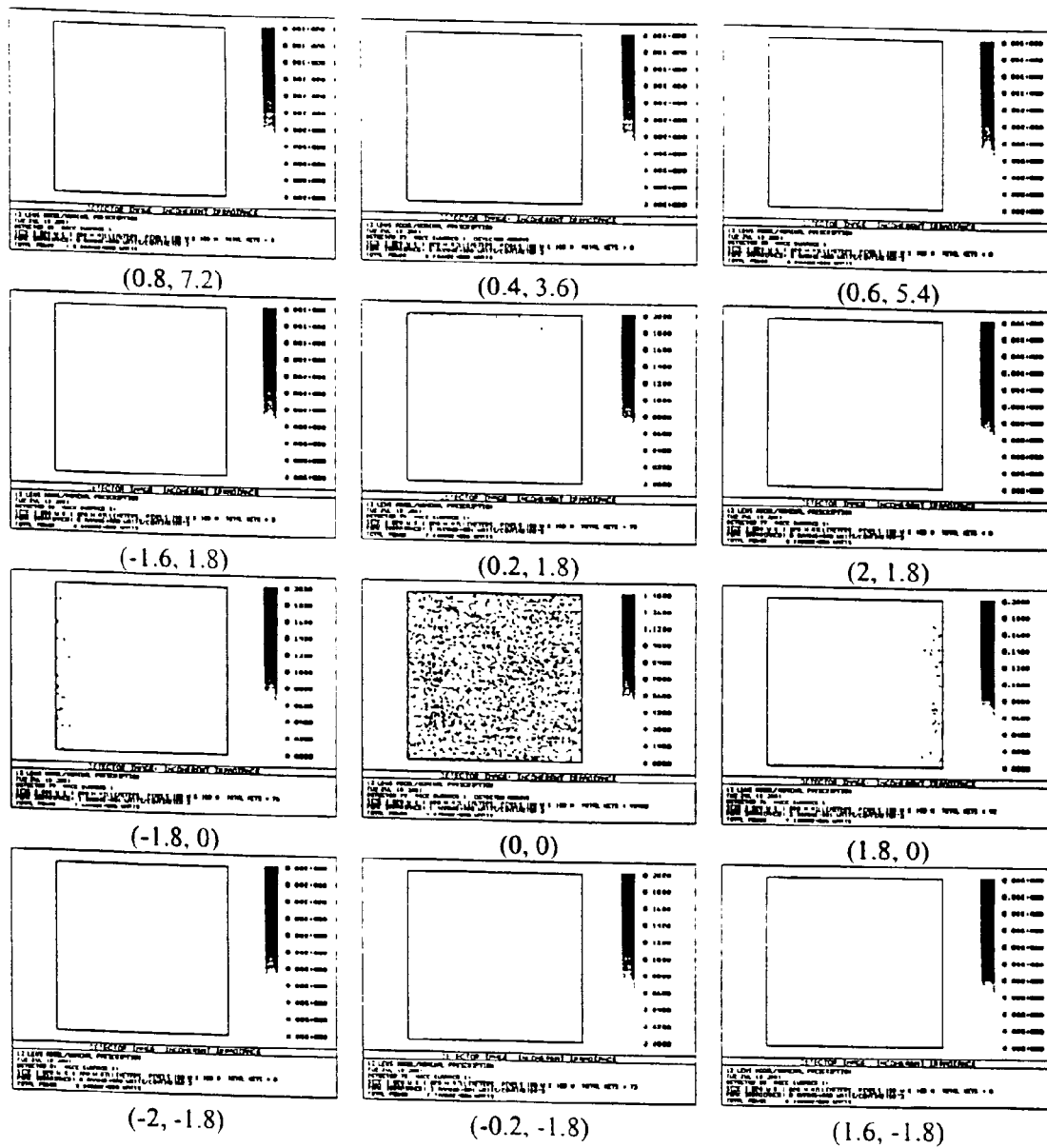
FIG. 23 is a depiction of irradiance distributions across each of the 12 modeled detectors in the MA image plane, using an increased inter-objective spacing baffle array according to the present invention.

In an increased inter-imaging-system spacing design, the nominal prescription was modified by reducing the thickness of the lens substrate 53 to 2 mm and re-optimizing the design of an individual imaging system using ZEMAX. The analysis results are shown in FIG. 23. FIG. 23 is a depiction of irradiance distributions across each of the 12 modeled image sensors 72 in the MA image plane. Each part of FIG. 23 is labeled with the center coordinates of the represented image sensor. The coordinates are measured in millimeters. The extended source is centered on (0, 0). FIG. 23 presents results for an analysis example with a 2 mm thick lens substrate 53 and 1.4 mm wide square baffles making up the baffle array. The pitch of microscope objectives is 1.8 mm. The results in FIG. 23 are based on tracing 10,000,000 rays through the system shown in FIG. 10.

The baffles were modeled as 1.4 mm wide, square-aperture "rectangular pipes." The spacing between adjacent objectives was increased to 1.8 mm. This arrangement is equivalent in function to baffles made from a 400-micron thick material.

The power emitted from the source is 1 W. This value is the result of integration over area and angle. The power integrated over the area of an image sensor aligned with the source area is 4.03 mW. The next highest level of area-integrated power is found in the image sensors adjacent to that image sensor centered on the source: (−1.8, 0), (0.2, 1.8), (−0.2, −1.8), (1.8, 0) mm. The area-integrated power on those detectors is 9.2 µW.

In the demonstrated examples above and for the constraints applied, it was determined that a baffle array can be used with an array of imaging systems such as miniature microscopes to suppress crosstalk between neighboring imaging systems. The baffle array increases in effectiveness as a length of the baffle array increases along the optical axis. Therefore, it is advantageous to increase the spacing between the rear surface of the last refractive lens substrate 53 and the image plane. In this series of examples, the thickness of the substrate 53 is preferably reduced to 2 mm to permit utilization of a longer baffle array Baffle arrays of these examples can be fabricated for example by single-point diamond-turning (SPDT). For example, a single acrylic sheet may be perforated with circular apertures that are cut with SPDT. The resultant baffle array may be coated with an absorbing medium. Alternatively, the acrylic may be combined with dyes that render the resultant material opaque to wavelengths that the image sensors detect.

Numerous modifications and variations of the present invention are possible in light of the above teachings. It is therefore to be understood that within the scope of the appended claims, the invention may be practiced otherwise than as specifically described herein.

The invention claimed is:

1. A multi-axis imaging system for imaging an object, comprising:
   a two-dimensions microscope array with a plurality of optical elements arranged in rows, said optical elements being configured to image respective sections of the object;
   a scanning mechanism for producing an imaging scan of the object as a result of a relative movement between the microscope array and the object;
   a plurality of image sensing elements corresponding to said optical elements and disposed in respective image spaces thereof to capture respective images of said sections of the object; and
   at least one baffle corresponding to a respective one of said optical elements and disposed along an optical pathway thereof to block light from outside the field of view of said respective one of said optical elements from reaching a corresponding image sensing element thereof;
   wherein said imaging scan is implemented along a linear direction of scan across the object and said rows of the microscope array are staggered with respect to said direction of scan, such that each of the optical elements images a respective continuous strip of the object along said direction of scan during the imaging scan of the scanning mechanism, said continuous strip being substantially free of overlap with continuous strips imaged by other optical elements.

2. The system of claim 1, wherein said at least one baffle comprises an opaque material having an aperture formed therein.

3. The system of claim 1, wherein said at least one baffle comprises a mask having an aperture formed therein.

4. The system of claim 3, wherein the mask is coated with an absorbing medium.

5. The system of claim 3, wherein said aperture is cylindrical.

6. The system of claim 3, wherein said at least one baffle comprises: a plurality of baffles corresponding to associated optical elements and formed by a respective plurality of apertures in said mask.

7. The system of claim 6, wherein the associated optical elements share a common image plane.

8. The system of claim 6, wherein the mask comprises an absorbing material.

9. The system of claim 1, wherein the optical elements have a common image plane.

10. The system of claim 1, wherein said at least one baffle comprises: a plurality of panels arranged to form a passage corresponding to said respective one of said optical elements.

11. The system of claim 10, wherein the panels comprise: an array of passages corresponding to and providing an arrayed baffle for a plurality of respective optical elements multiple apertures therethrough.

12. The system of claim 11, wherein the panels interlock to form the at ray of passages.

13. The system of claim 10, wherein the panels are made of at least one of an absorbing, a non-reflecting, and a non-scattering medium.

14. The system of claim 1, wherein said at least one baffle comprises: a plurality of baffles arranged in an array.

15. The system of claim 14, wherein the array is produced at least in part by injection molding.

16. The system of claim 14, wherein the array is produced at least in part by single point diamond turning.

17. The system of claim 14, wherein the array is produced at least in part by a lithographic process.

18. The system of claim 14, wherein the array is produced from a master.

19. The system of claim 14, wherein the array is produced by laser cutting.

20. The system of claim 14, wherein the array comprises at least one of a plastic, a hybrid glass, a photosensitive material, an x-ray sensitive material, an electron-sensitive material, and a metal alloy.

21. The system of claim 14, wherein the array comprises at least one of rectangular dross sectional walls, cylindrical cross sectional walls, faceted cross sectional walls, and tapered cross sectional walls.

22. The system of claim 14, wherein the array comprises a plurality of apertures formed in a material.

23. A multi-axis imaging system, comprising:
a plurality of optical elements arranged to produce in respective image spaces thereof respective images of respective regions in respective object spaces thereof;
a plurality of image sensing elements corresponding to said respective optical elements and disposed in said respective image spaces thereof to capture the respective images of the respective regions in respective object spaces thereof; and
at least one baffle corresponding to a respective one of said optical elements and disposed along an optical pathway thereof to block light from outside the field of view of said respective one of said optical elements from reaching a corresponding image sensing element thereof;
wherein said at least one baffle comprises: a plurality of masks having at least one aperture formed therein corresponding to said respective one of said optical elements and being disposed at different positions along an optical axis of at least one of said optical elements.

24. The system of claim 23, wherein the masks are disposed between said respective one of said optical elements and a corresponding image sensing element.

25. The system of claim 24, further comprising: a positioning device configured to align the plurality of masks.

26. The system of claim 25, wherein the positioning device comprises: a positioning aperture in at least one of said masks; and a pin for insertion through the positioning aperture.

27. A multi-axis imaging system, comprising:
a plurality of optical elements arranged to produce in respective image spaces thereof respective images of respective regions in respective object spaces thereof;
a plurality of image sensing elements corresponding to said respective optical elements and disposed in said respective image spaces thereof to capture the respective images of the respective regions in respective object spaces thereof; and
at least one baffle corresponding to a respective one of said optical elements and disposed along an optical pathway thereof to block light from outside the field of view of said respective one of said optical elements from reaching a corresponding image sensing element thereof;
wherein said at least one baffle comprises: a tubular member disposed substantially parallel to an optical axis of said respective one of said optical elements so as to block from reaching the corresponding image sensing element light whose angle of incidence is greater than a predetermined value.

28. The system of claim 27, wherein the tubular member has a polygonal cross section.

29. The system of claim 27, wherein the tubular member is made of at least one of an absorbing, a non-reflecting, and a non-scattering medium.

30. The system of claim 27, wherein the plurality of optical elements, the plurality of image sensing elements, and the at least one baffle comprise a microscope array.

31. The system of claim 27, wherein the plurality of optical elements, the plurality of image sensing elements, and the at least one baffle comprise an array microscope.

32. A multi-axis imaging system, comprising:
a plurality of optical elements arranged to produce in respective image spaces thereof respective images of respective regions in respective object spaces thereof;
a plurality of image sensing elements corresponding to said respective optical elements and disposed in said respective image spaces thereof to capture the respective images of the respective regions in respective object spaces thereof; and
at least one baffle corresponding to a respective one of said optical elements and disposed along an optical pathway thereof to block light from outside the field of view of said respective one of said optical elements from reaching a corresponding image sensing element thereof;
wherein said at least one baffle comprises a plurality of panels arranged to form a passage corresponding to said respective one of said optical elements; the panels comprise an array of passages corresponding to and providing an arrayed baffle for a plurality of respective optical elements; the panels interlock to form the array of passages; and the panels interlock so as to move relative to one another to produce substantially parallelogram-shaped passages of a selected base to height ratio.

33. A multi-axis imaging system, comprising:
   a plurality of optical elements arranged to produce in respective image spaces thereof respective images of respective regions in respective object spaces thereof;
   a plurality of image sensing elements corresponding to said respective optical elements and disposed in said respective image spaces thereof to capture the respective images of the respective regions in respective object spaces thereof; and
   at least one baffle corresponding to a respective one of said optical elements and disposed along an optical pathway thereof to block light from outside the field of view of said respective one of said optical elements from reaching a corresponding image sensing element thereof;
   wherein said baffle comprises an opaque material having an aperture therethrough, the aperture having a plurality of constrictions therein.

34. The system of claim 33, wherein the optical elements have a common image plane and said opaque material has multiple ape;tures therethrough.

35. The system of claim 33, wherein the plurality of optical elements, the plurality of image sensing elements, and the at least one baffle comprise an array microscope.

36. A multi-axis imaging system, comprising:
   a plurality of optical elements arranged to produce in respective image spaces thereof respective images of respective regions in respective object spaces thereof;
   a plurality of image sensing elements corresponding to said respective optical elements and disposed in said respective image spaces thereof to capture the respective images of the respective regions in respective object spaces thereof; and
   at least one baffle corresponding to a respective one of said optical elements and disposed along an optical pathway thereof to block light from outside the field of view of said respective one of said optical elements from reaching a corresponding image sensing element thereof;
   wherein said at least one baffle comprises a plurality of baffles arranged in an array; the array comprises a plurality of apertures formed in a material; and the at least one baffle comprises a plurality of said arrays separated from one another along optical axes of the optical elements.

37. The system of claim 36, wherein at least one of said plurality of apertures in each of said arrays is surrounded by an opaque material.

38. The system of claim 36, wherein at least one of said plurality of apertures is surrounded by an opaque material.

39. A device for reducing cross talk in an imaging system having a plurality of imaging elements, comprising:
   at least one baffle disposed between an image sensing element of a respective one of said imaging elements and an object to be imaged thereby, said baffle being positioned to block light outside the field of view of said respective one of said imaging elements from reaching a corresponding image sensing element thereof;
   wherein said at least one baffle comprises a plurality of masks having apertures formed therein and corresponding to said respective one of said imaging elements and being disposed at different positions along an optical axis of said respective one of said imaging elements.

40. The device of claim 39, wherein said at least one baffle comprises an opaque material having an aperture formed therein.

41. The device of claim 39, wherein the masks are disposed between an optical element of said one of said imaging elements and the corresponding image sensing element thereof.

42. The device of claim 39, further comprising:
   a positioning device configured to align the plurality of masks.

43. The device of claim 42, wherein the positioning device comprises: a positioning aperture in one or more of the plurality of masks; and a pin for insertion through the positioning aperture.

44. A device for reducing cross talk in an imaging system having a plurality of imaging elements, comprising:
   at least one baffle disposed between an image sensing element of a respective one of said imaging elements and an object to be imaged thereby, said baffle being positioned to block light outside the field of view of said respective one of said imaging elements from reaching a corresponding image sensing element thereof;
   wherein said at least one baffle comprises a tubular member disposed substantially parallel to an optical axis of said respective one of said imaging elements so as to block from reaching said corresponding image sensing element thereof light whose angle of incidence is greater than a predetermined value.

45. The device of claim 44, wherein said at least one baffle comprises a mask having at least one aperture formed therein corresponding to said respective one of said optical elements.

46. The device of claim 45, wherein the mask is coated with an absorbing medium.

47. The device of claim 45, wherein said at least one aperture is cylindrical.

48. The device of claim 45, wherein the mask comprises an absorbing material.

49. The device of claim 44, wherein the tubular member has a polygonal cross section.

50. The device of claim 44, wherein the tubular member is made of at least one of an absorbing, a non-reflecting, and a non-scattering medium.

51. The device of claim 44, wherein said at least one baffle comprises a plurality of panels arranged to form a passage corresponding to said at least one imaging element.

52. The device of claim 51, wherein the panels form an array of passages corresponding to and providing an arrayed baffle for said plurality of imaging elements.

53. The device of claim 52, wherein the panels interlock to form the array of passages.

54. The device of claim 44, wherein said baffle comprises an opaque material having an aperture therethrough, the aperture having a plurality of constrictions therein.

55. The device of claim 54, wherein said material, has an array of apertures therethrough corresponding to respective imaging elements.

56. The device of claim 44, wherein said at least one baffle comprises; a plurality of baffles arranged in an array and corresponding to respective imaging elements.

57. The device of claim 56, wherein the array is produced at least in part by injection molding.

58. The device of claim 56, wherein the array is produced at least in part by single point diamond turning.

59. The device of claim 56, wherein the array is produced at least in part by a lithographic process.

60. The device of claim 59, wherein the array is produced from a master.

61. The device of claim 59, wherein the array is produced by laser cutting.

62. The device of claim 56, wherein the array comprises at least one of a plastic, a hybrid glass, a photosensitive material, an x-ray sensitive material, an electron-sensitive material, and a metal alloy.

63. The device of claim 56, wherein the array comprises at least one of rectangular cross sectional walls, cylindrical cross sectional walls, faceted cross sectional walls, and tapered cross sectional walls.

64. The device of claim 56, wherein the array comprises: a plurality of apertures formed in a material.

65. A device for reducing cross talk in an imaging system having a plurality of imaging elements, comprising:
at least one baffle disposed between an image sensing element of a respective one of said imaging elements and an object to be imaged thereby, said baffle being positioned to block light outside the field of view of said respective one of said imaging elements from reaching a corresponding image sensing element thereof;
wherein said at least one baffle comprises a plurality of panels arranged to form a passage corresponding to said at least one imaging element; the panels form an array of passages corresponding to and providing an arrayed baffle for said plurality of imaging elements; the panels interlock to form the array of passages; and the panels interlock so as to move relative to one another to produce substantially parallelogram-shaped passages of a selected base to height ratio.

66. The device of claim 65, wherein the panels are made of at least one of an absorbing, a non-reflecting, and a nonscattering medium.

67. A device for reducing cross talk in an imaging system having a plurality of imaging elements, comprising:
at least one baffle disposed between an image sensing element of a respective one of said imaging elements and an object to be imaged thereby, said baffle being positioned to block light outside the field of view of said respective one of said imaging elements from reaching a corresponding image sensing element thereof;
wherein said at least one baffle comprises a plurality of baffles arranged in an array and corresponding to respective imaging elements; the array comprises a plurality of apertures formed in a material; and the array comprises a plurality of arrays separated from one another along optical axes of the imaging elements.

68. The device of claim 67, wherein at least one of said plurality of apertures on each of said arrays is surrounded by an opaque material.

69. The multi-axis imaging system of claim 67, wherein at least one of said plurality of apertures is surrounded by an opaque material.

70. A multi-axis imaging system for imaging an object, comprising:
a two-dimensional microscope array with a plurality of optical elements arranged in rows, said optical elements being configured to image respective sections of the object;
a scanning mechanism for producing an imaging scan of the object as a result of a relative movement between the microscope array and the object;
a plurality of image sensing elements corresponding to said optical elements and disposed in respective image spaces thereof to capture respective images of said sections of the object; and
means for blocking light from outside the field of view of at least one of said optical elements and thereby preventing said light from reaching a corresponding image sensing element thereof;
wherein said imaging scan is implemented along a linear direction of scan across the object and said rows of the microscope array are staggered with respect to said direction of scan, such that each of the optical elements images a respective continuous strip of the object along said direction of scan during the imaging scan of the scanning mechanism, said continuous strip being substantially free of overlap with continuous strips imaged by other optical elements.

71. A method for imaging an object with an imaging system, comprising:
providing a two-dimensional imaging array having a plurality of imaging elements arranged in rows, said imaging elements being disposed with respect to an image plane of the imaging array and configured to image respective sections of the object;
positioning at least one baffle along an optical axis of a respective imaging element to block light outside the field of view of said respective imaging element from reaching a respective image sensing element;
producing an imaging scan of the object as a result of a relative movement between the imaging array and the object; and
capturing image data representative of said respective sections of the object from a plurality of image sensing elements;
wherein said image in scan is implemented along a linear direction of scan and said rows of the imaging array are staggered with respect to said direction of scan, such that each of the imaging elements images a respective continuous strip of the object along the direction of scan during said imaging scan, said continuous strip being substantially free of overlap with continuous strips imaged by other imaging elements.

72. The method of claim 71, wherein the positioning comprises: positioning said at least one baffle to block light from within the imaging system.

73. The method of claim 72, wherein the positioning comprises: positioning said at least one baffle to block light from another imaging element other than said respective imaging element.

74. The method of claim 71, wherein the positioning comprises: positioning a plurality of baffles along optical axes of the imaging elements to block light outside the field of view of said respective imaging elements from reaching respective image sensing elements thereof.

75. The method of claim 74, further comprising: arranging said plurality of baffles in an array.

76. The method of claim 75, further comprising; positioning the array of baffles to block light from within the imaging system.

77. The method of claim 76, further comprising: positioning the array to block light from another imaging element other than an imaging element to which a given baffle corresponds.

78. The method of claim 75, further comprising: preparing said plurality of baffles by forming apertures in a member of the imaging system so as to create said array.

79. The method of claim 78, further comprising: preparing the member from an opaque material.

80. The method of claim 78, further comprising: surrounding the apertures with an opaque material.

81. The method of claim 75, further comprising: preparing said plurality of baffles by interconnecting a plurality of panels arranged to form passages for a plurality of corresponding imaging elements.

82. The method of claim 81, further comprising: preparing the panels so as to interlock and form the array of passages.

83. A method for detecting light by an imaging element in an imaging system having a plurality of imaging elements and image sensing elements, comprising:
 positioning a plurality of baffles along optical axes of the imaging elements to block light outside the field of view of said respective imaging elements from reaching respective image sensing elements thereof;
 arranging said plurality of baffles in an array;
 preparing said plurality of baffles by interconnecting a plurality of panels arranged to form passages for a plurality of corresponding imaging elements;
 preparing the panels so as to interlock and form an array of passages; and
 moving the panels relative to one another to produce a skewed pattern of substantially parallelogram shaped passages of a selected base to height ratio so as to substantially match a skewed pattern of imaging elements.

84. A method for detecting light by an imaging element in an imaging system having a plurality of imaging elements and image sensing elements, comprising:
 positioning a plurality of baffles along optical axes of the imaging elements to block light outside the field of view of said respective imaging elements from reaching respective image sensing elements thereof;
 arranging said plurality of baffles in an array; and
 positioning a plurality of arrays of said baffles along the optical axes of the imaging elements.

85. The method of claim 84, further comprising: aligning the arrays of baffles by placing a positioning pin through a positioning aperture in the plurality of arrays.

* * * * *

UNITED STATES PATENT AND TRADEMARK OFFICE
CERTIFICATE OF CORRECTION

PATENT NO. : 7,116,437 B2 Page 1 of 1
APPLICATION NO. : 10/243648
DATED : October 3, 2006
INVENTOR(S) : Weinstein et al.

It is certified that error appears in the above-identified patent and that said Letters Patent is hereby corrected as shown below:

Column 18, line 35, cancel the text "dimensions" and insert the following text: --dimensional--;

Column 19, line 20, cancel the text "multiple apertures therethrough";

Column 19, line 22, cancel the text "at ray" and insert the following text: --array--;

Column 19, line 44, cancel the text "dross" and insert the following text: --cross--;

Column 21, line 24, cancel the text "ape;tures" and insert the following text: --apertures--;

Column 23, line 49, cancel the text "ma" and insert the following text: --in a--.

Signed and Sealed this

Sixteenth Day of January, 2007

JON W. DUDAS
*Director of the United States Patent and Trademark Office*